(12) United States Patent
Kyuma

(10) Patent No.: US 7,349,013 B2
(45) Date of Patent: Mar. 25, 2008

(54) IMAGING APPARATUS HAVING A LENS DEVICE FOR A ZOOMING CONTROL OPERATION AND THE METHOD OF USING THE SAME

(75) Inventor: Kenji Kyuma, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 10/643,805

(22) Filed: Aug. 18, 2003

(65) Prior Publication Data

US 2004/0155978 A1 Aug. 12, 2004

Related U.S. Application Data

(62) Division of application No. 09/208,546, filed on Dec. 9, 1998, now Pat. No. 6,650,367.

(30) Foreign Application Priority Data

| Dec. 11, 1997 | (JP) | ................................. | 9-341363 |
| Dec. 12, 1997 | (JP) | ................................. | 9-342756 |
| Dec. 12, 1997 | (JP) | ................................. | 9-342757 |
| Dec. 12, 1997 | (JP) | ................................. | 9-342758 |

(51) Int. Cl.
H04N 5/232 (2006.01)
H04N 5/262 (2006.01)

(52) U.S. Cl. ................................. 348/240.1; 348/347

(58) Field of Classification Search ............. 348/240.1, 348/240.99, 240.2, 240.3, 208.6, 347, 357
See application file for complete search history.

(56) References Cited

U.S. PATENT DOCUMENTS

| 4,843,475 | A |   | 6/1989 | Imai |
| 5,257,058 | A |   | 10/1993 | Mabuchi |
| 5,420,632 | A | * | 5/1995 | Yamagiwa ................ 348/240.3 |
| 5,485,208 | A |   | 1/1996 | Mabuchi et al. |

(Continued)

FOREIGN PATENT DOCUMENTS

EP 0795769 A1 9/1997

(Continued)

*Primary Examiner*—John M. Villecco
(74) *Attorney, Agent, or Firm*—Morgan & Finnegan, LLP

(57) ABSTRACT

An object of the present invention is to suitably perform a zooming control operation in the case that a zoom ring is provided at a lens-side portion and zoom switches are provided at a camera-body-side portion of a lens-interchangeable video camera. To achieve this object, in the case that no zoom lens stop request is provided from the camera-body-side portion, it is judged from information sent from the camera-body-side portion which of a tele direction and a wide direction the moving direction of the zoom lens group is. Moreover, when the zoom angle is not placed at a tele end or at a wide end, lenses are driven by calculating data for driving the lenses. Thereafter, tele information is set or cleared according to whether the zoom lens group is placed at the tele end, Subsequently, zoom-ring operating information is detected. The detected zoom-ring operating information is sent to the camera-body-side portion. Then, the zoom lens group is controlled by generating zooming control information at the camera-body-side portion according to the zoom-ring operating information and zoom-switch operating information.

5 Claims, 28 Drawing Sheets

U.S. PATENT DOCUMENTS

| | | |
|---|---|---|
| 5,608,457 A | 3/1997 | Tohyama et al. |
| 5,650,819 A | 7/1997 | Sato et al. |
| 5,701,157 A | 12/1997 | Kato et al. |
| 5,812,189 A | 9/1998 | Kimura et al. |
| 5,933,187 A | 8/1999 | Hirasawa et al. |
| 5,973,857 A | 10/1999 | Kaneda |
| 6,348,948 B1 | 2/2002 | Kyuma |
| 6,445,416 B1 | 9/2002 | Kyuma et al. |
| 6,489,993 B1 | 12/2002 | Sato et al. |

FOREIGN PATENT DOCUMENTS

| | | | |
|---|---|---|---|
| JP | 62133430 A | | 6/1987 |
| JP | 05034761 | | 2/1993 |
| JP | 05284404 A | * | 10/1993 |
| JP | 06086131 A | * | 3/1994 |
| JP | 09096756 A | | 4/1997 |
| JP | 09243899 A | * | 9/1997 |

\* cited by examiner

130 INTERCHANGEABLE LENS UNIT

140
INTERCHANGEABLE
LENS UNIT

IMAGING APPARATUS HAVING A LENS DEVICE FOR A ZOOMING CONTROL OPERATION AND THE METHOD OF USING THE SAME

This is divisional Ser. No. 09/208,546, filed Dec. 9, 1998 now U.S. Pat. No. 6,650,367.

BACKGROUND OF THE INVENTION

1. Field of the Invention

The present invention relates to a lens device having a zoom lens, an imaging device equipped with this lens device and adapted to perform electronic zooming, an imaging system, an lens control system and a computer readable storage medium.

2. Description of the Related Art

FIG. 4 is a block diagram showing the configuration of a conventional lens-interchangeable video camera. In this figure, reference numeral 100 designates an interchangeable lens unit; and 200 a camera body unit to which the interchangeable lens unit is detachably attached. In the interchangeable lens unit 100, reference numeral 101 denotes a fixed front lens group; 102 a variator or zoom lens group for zooming or changing a magnification; 103 a fixed lens group; 104 a compensator or focusing lens group for performing both functions of compensating and focusing. These lens groups 101 to 104 constitute a lens system of inner focusing type.

Reference numeral 106 designates a stepping motor for moving the variator lens group 102; 108 a rotation shaft that is connected to a gear 107 through the stepping motor 106 and has a screw; 109 a rack that is movably mounted on the rotation shaft 108 and provided with the variator lens group 102. Reference numeral 105 denotes a driver for driving the stepping motor 106; and 110 a zoom encoder for detecting the position of the variator lens group 102.

Reference numeral 112 designates a stepping motor for moving the compensator lens group 104; 113 a rotation shaft that is directly connected to a stepping motor 112 and has a screw; 114 a rack that is movably mounted on the rotation shaft 113 and provided with the compensator lens group 104. Reference numeral 111 denotes a driver for driving the stepping motor 112. Reference numeral 115 designates a microcomputer (hereunder sometimes referred to as a lens microcomputer) that communicates with a microcomputer 208 of the camera body unit 200 and controls each of the drivers 105 and 111 and receives position detection information from the zoom encoder 110.

Further, in the camera body unit 200, reference numeral 201 denotes an imager such as CCD; 202 CDS/AGC circuit for performing a correlated double sampling operation and an automatic gain control operation; 203 A/D converter; 204 a signal processing circuit; 205 an enlargement processing circuit for performing electronic zooming; 206 a signal processing circuit; 207 D/A converter; 208 a microcomputer (hereunder sometimes referred to as a camera microcomputer) for controlling the entire video camera and for communicating with the lens microcomputer 115; 210 and 211 zoom switches for moving the variator lens group in a tele or telephoto direction and a wide or wide-angle direction, respectively; 212 and 213 focus switches for moving a focus position to an infinite focus position and to a shortest focus position, respectively; and 209 a group of these switches.

Next, an operation of this video camera will be described hereinbelow. When the interchangeable lens unit 100 is attached to the camera body unit 200, electric power is supplied from the camera body unit 200 to the interchangeable leas unit 100. Then, an image is formed on the imager 201 from light that comes from an object through the lens groups 101 to 104. Video signals obtained by photoelectric conversion performed in the imager 201 are processed by the CDS/AGC circuit 202. Subsequently, the video signals are converted by the A/D converter 203 into digital video signals which are then sent to the signal processing circuit 204. After the signal processing circuit 204 gamma-corrects the digital video signals, the enlargement processing circuit 205 performs enlargement processing (to be described later) on the gamma-corrected video signals. Further, the signal processing circuit 206 performs balanced modulation on color signals. The processed signals are converted by the D/A converter 207 into digital analog video signals which are then sent to VTR (not shown).

Next, operations of the lens microcomputer 115 and zooming and focusing operations will be described hereinbelow. When the zooming or focusing operation is designated, the lens microcomputer 115 determines the rotation speed and direction of each of the motors 106 and 112 by executing programs. Further, the lens microcomputer 115 outputs control signals representing the determined rotation speed and direction, and controls the stepping motors 106 and 112 through the drivers 105 and 111, respectively. Incidentally, regarding the zooming operation, the lens microcomputer 115 determines the rotation direction of the motor 106 according to the states of the switches 210 and 211, which are represented by signals outputted from the camera microcomputer 208, respectively. Regarding the focusing operation, in the case of adjusting focus by a manual operation, the rotation direction of the motor 112 is determined according to the states of the switches 212 and 213, which are represented by signals sent from the camera microcomputer 208. On the other hand, in the case of adjusting focus by an autofocusing (AF) operation, the rotation direction of the motor 112 is determined by executing AF processing routine in the lens microcomputer 115.

Each of the motors 106 and 112 rotate by being controlled according to the aforementioned control signals. Thus, the rotation shaft 108 rotates through the gear 107. Moreover, the rotation shaft 113 rotates. Each of the racks 109 and 114 moves back and forth together with a corresponding one of the lens groups 102 and 104. Consequently, predetermined zoomed and focused conditions of the video camera are obtained.

Next, enlargement processing (namely, electronic zooming) to be performed on an image in the enlargement processing circuit 205 by utilizing linear interpolation will be described hereinbelow. Enlargement processing is performed by operating the zoom switches 210 and 211 by a cameraman. When an original image shown in the left-side part of FIG. 5A is expanded into an enlarged image shown in the right-side part thereof, scan lines representing the original image are as illustrated in the left-side part of FIG. 5B, and scan lines representing the enlarged image are as illustrated in the right-side part thereof. In this case, the scan lines, which represent the enlarged image and are respectively indicated by dashed lines in the right-side part of FIG. 5B, are newly formed from the scan lines A to F representing the original image shown in the left-side part thereof. Thus, each of the scan lines respectively indicated by dashed lines is obtained by multiplying data representing corresponding ones of scan lines, which are respectively indicated by solid lines in the right-side part of FIG. 5B, by weight factors (or correction coefficients) corresponding to the distances thereof and adding up resultant data. The original image can be enlarged at an arbitrary enlargement magnification by performing such linear interpolation processing in the vertical and horizontal directions.

FIG. 6 shows the configuration of the enlargement processing circuit 205. For simplicity of description, this figure illustrates only the vertical enlargement processing. As shown in FIG. 6, input video signals 300 are stored in a memory circuit 301 under the control of a memory control signal generating circuit 302. Microcomputer interface circuit 304 receives an enlargement magnification and enlargement information from the camera microcomputer 208. Based on this, an enlarged magnification determining circuit 303 outputs the enlargement magnification to the memory control signal generating circuit 302 and an interpolation coefficient generating circuit 308. The memory control signal generating circuit 302 reads signals, which respectively represent an nth line and an (n−1)th line delayed by 1 H (namely, one horizontal scanning interval) from the nth line, from the memory circuit 301. The interpolation coefficient generating circuit 308 generates interpolation coefficients corresponding to the enlargement magnification and gives the generated interpolation coefficients to multipliers 305 and 306. These multipliers multiply the signals, which respectively represent an nth line and an (n−1)th line, by the interpolation coefficients. Outputs of these multipliers are added up in an adder 307. Resultant signal is outputted therefrom as an output video signal 310.

Next, processing to be performed in the camera microcomputer 208 will be described with reference to a flowchart of FIG. 7. In step 401, the processing is started. Then, predetermined initialization is performed in step 402. Subsequently, in step 403, the camera microcomputer 208 waits for a vertical synchronization signal Vd. When the vertical synchronization signal Vd is inputted to the camera microcomputer 208, control proceeds to step 404 whereupon the camera microcomputer 208 makes predetermined communication with the lens microcomputer 115. Thereafter, the camera microcomputer 208 performs AF operation and an automatic exposure (AE) operation in step 405. Then, the camera microcomputer 208 performs electronic and optical zooming in step 406. Subsequently, control returns to step 403.

FIG. 8 is a flowchart illustrating the operation performed in the aforementioned step 404 in more detail. As illustrated in FIG. 8, the operation is started in step 501. Then, the camera microcomputer 208 sends a communication request signal to the lens microcomputer 115 in step 502. Subsequently, control advances to step 503 whereupon the camera microcomputer 208 checks whether a communication enabling signal comes thereto from the lens microcomputer 115. If so, control proceeds to step 505. If not, control advances to step 504 whereupon the camera microcomputer 208 waits for a communication enabling signal for a predetermined time. If no communication enabling signal comes thereto within the predetermined time, the camera microcomputer 208 gives up communicating with the lens microcomputer 115. Then, the camera microcomputer 208 finishes the communicating operation in step 506.

In the case that a communication enabling signals comes thereto within the predetermined time, bidirectional communication between the camera microcomputer 208 and the lens microcomputer 115 is performed in step 505. At that time, data sent from the camera microcomputer 208 to the lens microcomputer 115 includes information on the halt or moving direction of the zoom lens group, which is obtained as a result of the operation performed in the aforementioned step 406. Further, data sent to the camera microcomputer 208 from the lens microcomputer 115 includes information on the inhibition/permission of electronic zooming. Subsequently, the camera microcomputer 208 terminates the communicating operation in step 506. Then, in step 507, control returns to the aforementioned step 406.

Next, the step 406 will be described in detail with reference to a flowchart of FIG. 9. As shown in FIG. 9, an operation is started in step 601. Then, in step 602, the camera microcomputer 208 checks whether the camera is performing zooming. When both the zoom switches 210 and 211 are pushed, or when neither of the zoom switches 210 and 211 is pushed, control proceeds to step 607. When only one of the zoom switches 210 and 211 is pushed, control proceeds to step 603 whereupon it is checked which of the zoom switches 210 and 211 is pushed. If the "TELE" switch 210 is pushed, control advances to step 604. If the "WIDE" switch 211 is pushed, control proceeds to step 608.

In step 604, the camera microcomputer 208 checks whether electronic zooming permission information comes thereto from the lens microcomputer 115. If the camera microcomputer 208 is permitted to perform electronic zooming, control advances to step 605. If not, control proceeds to step 610. In step 605, the camera microcomputer 208 checks whether the zoom lens group 102 is placed at a tele end. If so, control advances to step 607. Otherwise, control proceeds to step 606 whereupon an electronic zooming operation is performed by increasing or decreasing the aforementioned interpolation coefficients according to which of the switches 210 and 211, and whereupon the camera microcomputer 208 controls the enlargement processing circuit 205 according to a result of the zooming operation. Upon completion of this control operation, the camera microcomputer 208 sends a zoom lens stop request signal to the lens microcomputer 115 in step 607. Further, in step 610, the camera microcomputer 208 sends the lens microcomputer 115 a request to move the zoom lens group to the tele side.

On the other hand, in step 608, the camera microcomputer 208 checks whether the camera is now performing electronic zooming. If so, control proceeds to step 606. Otherwise, control advances to step 609 whereupon the camera microcomputer 208 sends the lens microcomputer 115 a request to move the zoom lens group to a wide side. Upon completion of the operation to be performed in one of the aforementioned steps 607, 609 and 610, control returns to a main routine in step 611.

FIG. 10 is a flowchart illustrating processing concerning a zooming operation, which is a part of the entire processing to be performed by the lens microcomputer 115. As illustrated in FIG. 10, the processing is started in step 701. Then, in step 702, the lens microcomputer 115 checks whether the aforementioned zoom lens stop request signal comes thereto from the camera microcomputer 208. If so, namely, if the zoom lens group should be stopped, control proceeds to step 708. Otherwise, control advances to step 703 whereupon the lens microcomputer 115 checks according to the information sent by the camera microcomputer 208 which of the tele direction and the wide direction the moving direction of the zoom lens group is. If the moving direction of the zoom lens group is the tele direction, control proceeds to step 704. If the wide direction, control advances to step 705.

In step 704, the lens microcomputer 115 checks whether the zoom lens group is positioned at the tele end. If so, control proceeds to step 708. Otherwise, control advances to step 706. Further, in step 705, the lens microcomputer 115 checks whether the zoom lens group is positioned at the wide end. If so, control proceeds to step 708. Otherwise, control advances to step 706. The moving speed of the zoom lens group and the moving speed and direction of the focusing lens group are calculated in step 706. According to a result of this calculation, the zoom lens group and the focusing lens group are driven in step 707. Furthermore, in step 708, the zoom lens group is stopped.

Upon completion of the operation performed in step 707 or 708, the lens microcomputer 115 checks in step 709 whether the zoom lens group is placed at the tele end. If so, control proceeds to step 710. Otherwise, control advances to step 711. In step 710, the lens microcomputer 115 sends the camera microcomputer 208 an electronic zooming enabling signal. Further, in step 711, the lens microcomputer 115 sends the camera microcomputer 208 an electronic zooming inhibiting signal. Upon completion of the operation performed in step 710 or 711, control returns to the main routine in step 712.

As described above, in the case that the zoom switches 210 and 211 are provided only in the camera body unit 200, optical zooming and electronic zooming are realized under the control of the camera microcomputer 208. However, in the case that a zoom ring 116 to be used for manually performing a zooming operation is provided in the interchangeable lens unit 100 as illustrated in FIG. 3, the conventional video camera has the problem that it is difficult to achieve suitable and smooth control of optical zooming and electronic zooming.

SUMMARY OF THE INVENTION

Accordingly, an object of the present invention is to solve the aforesaid problem, thereby achieving suitable control of zooming operations in the case that zooming operation means are provided at both camera-body-side and lens-side portions, respectively.

Further, another object of the present invention is to smoothly switch between an optical zooming function and an electronic zooming function.

Moreover, still another object of the present invention is to enable an electronic zooming function independent of whether a zooming mechanism is provided in a lens-side portion.

To solve the aforementioned problem and to achieve the foregoing objects, according to an aspect of the present invention, there is provided a lens device which comprises variator lens means for performing a zooming operation, zoom operating means for operating the aforesaid variator lens means, information output means for outputting operation information sent from the aforesaid zoom operating means and for outputting zooming position information of the aforesaid variator lens means, information input means for receiving control information, which is used for controlling the aforesaid variator lens means, from an external device, and variator control means for controlling a zooming operation of the aforesaid variator lens means according to the inputted control information.

Further, according to another aspect of the present invention, there is provided an imaging apparatus which comprises imaging means for imaging an object and for outputting an image signal, information input means for receiving external zoom operating information and zoom position information to be supplied to external variator lens means, zoom operating means for receiving internal zoom operating information to be supplied to the aforesaid external variator lens means and information output means for generating and outputting optical zooming control information to be used for controlling a zooming operation of the aforesaid external variator lens means according to the inputted external zoom operating information and the inputted zoom position information and the internal zoom operating information received from the aforesaid zoom operating means.

Moreover, according to still another aspect of the present invention, there is provided an imaging system that comprises a lens device having a variator lens means for performing a zooming operation, lens-side zoom operating means for operating the aforesaid variator lens means, lens-side information output means for outputting lens-side zoom operating information and zoom position information on a zoom position of the aforesaid variator lens means, which are received from the aforesaid lens-side zoom operating means, lens-side information input means for receiving optical zoom control information to be used for controlling the aforesaid variator lens means, and variator control means for controlling a zooming operation of the aforesaid variator lens means according to the received control information, and that further has an imaging apparatus having imaging means for imaging an object and for outputting an image signal, camera-body-side information input means for receiving the lens-side zoom operating information and zoom position information from the aforesaid lens-side information output means, camera-body-side zoom operating means for receiving camera-body-side zoom operating information to be supplied to the aforesaid variator lens means, and camera-body-side information output means for generating optical zooming control information to be used to control a zooming operation of the aforesaid variator lens means, according to the received lens-side zoom operating information and the received zoom position information and the camera-body-side zoom operating information and for outputting the optical zooming control information to the aforesaid lens-side information input means.

Furthermore, according to yet another aspect of the present invention, there is provided a computer readable storage medium for storing a program causing a computer to execute the steps of outputting operation information, which is obtained when a variator lens is operated, and zoom position information which represents a zoom position of the aforesaid variator lens, inputting control information, which is used for controlling the aforesaid variator lens, from an external device, and controlling the aforesaid variator lens according to the inputted control information.

Further, according to still another aspect of the present invention, there is provided a computer readable storage medium for storing a program causing a computer to execute the steps of imaging an object and outputting an image signal, receiving external zoom operating information and zoom position information to be supplied to an external variator lens, receiving internal zoom operating information to be supplied to the aforesaid external variator lens, and generating and outputting optical zooming control information to be used for controlling a zooming operation of the aforesaid external variator lens according to the inputted external zoom operating information and the inputted zoom position information and the internal zoom operating information.

Further, according to yet another aspect of the present invention, there is provided a lens device which comprises variator lens means for performing a zooming operation, zoom operating means for operating the aforesaid variator lens means, information output means for outputting first zoom operating information, which is received from the aforesaid zoom operating means, and zoom position information representing a zoom position of the aforesaid variator lens means, information input means for receiving second zoom operating information and zooming inhibition information from an external device, and variator control means for controlling a zooming operation of the aforesaid variator lens means according to the first zoom operating information, the inputted second zoom operating information and the inputted zooming inhibition information.

Moreover, according to still another aspect of the present invention, there is provided a camera apparatus which comprises imaging means for imaging an object and for outputting an image signal, information input means for receiving first zoom operating information and zoom position information to be supplied to external variator lens means, zoom operating means for receiving second zoom operating information to be supplied to the aforesaid external variator lens means, information output means for outputting the second zooming control information and optical zooming inhibition information to be used for inhibiting a zooming operation of the aforesaid external variator lens means, electronic zooming means for performing electronic enlargement processing on an image represented by the image signal, and electronic zooming control means for controlling the aforesaid electronic zooming means according to the first zoom operating information, the zoom position information and the second zoom operating information.

Furthermore, according to yet another aspect of the present invention, there is provided a camera system which comprises a lens device having a variator lens means for performing a zooming operation, lens-side zoom operating means for operating the aforesaid variator lens means, lens-side information output means for outputting first zoom operating information, which is received from the aforesaid lens-side zoom operating means, and zoom position information on a zoom position of the aforesaid variator lens means, lens-side information input means for receiving second zoom operating information and zooming inhibition information from an external device and variator control means for controlling a zooming operation of the aforesaid variator lens means according to the received second zoom operating information and the zooming inhibition information and the first zoom operating information, and further comprises an imaging apparatus having imaging means for imaging an object and for outputting an image signal, camera-body-side information input means for receiving the first zoom operating information and zoom position information from the aforesaid lens-side information output means, camera-body-side zoom operating means for receiving the second zoom operating information to be supplied to the aforesaid variator lens means, and camera-body-side information output means for outputting the aforesaid lens-side information input means the second zoom operating information and the optical zooming inhibition which is used for inhibiting the aforesaid variator lens means from performing a zooming operation, electronic zooming means for performing electronic enlargement processing on an image represented by the image signal, and electronic zooming control means for controlling the aforesaid electronic zooming means according to the first zoom operating information, the zoom position information and the second zoom operating information.

Further, according to still another aspect of the present invention, there is provided a computer readable storage medium for storing a program causing a computer to execute the steps of outputting first zoom operating information, which is obtained when a variator lens is operated, and zoom position information which represents a zoom position of the aforesaid variator lens, inputting second zoom operating information and zooming inhibition information, which are received from an external device, and controlling the aforesaid variator lens according to the inputted second zoom operating information, the inputted zooming inhibition information and the first zoom operating information.

Moreover, according to yet another aspect of the present invention, there is provided a computer readable storage medium for storing a program causing a computer to execute the steps of imaging an object and outputting an image signal, receiving first zoom operating information and zoom position information to be supplied to an external variator lens, receiving second zoom operating information to be supplied to the aforesaid external variator lens, outputting the second zooming control information and optical zooming inhibition information to be used for inhibiting the aforesaid external variator lens from performing a zooming operation, and performing electronic zooming for electronically enlarging an image represented by the image signal according to the first zoom operating information and the second zoom operating information and the zoom position information.

Furthermore, according to still another aspect of the present invention, there is provided a lens control system which comprises a first device having optical variator means for optically changing a magnification of an image, a second device having electronic variator means for electronically enlarging an image by signal processing, and first and second variator operating members respectively provided in the aforesaid first and second devices. In this lens control system, when the aforesaid optical variator means is operated, the aforesaid optical variator means is controlled in the aforesaid first device according to information for operating the aforesaid first and second variator operating members. Further, when the aforesaid electronic variator means is operated, the aforesaid electronic variator means is controlled in the aforesaid second device according to information for operating the aforesaid first and second variator operating members. Furthermore, during the aforesaid electronic variator means is operated, the aforesaid first device inhibits the aforesaid optical variator means from operating.

Further, according to yet another aspect of the present invention, there is provided a camera system which comprises a lens device having an optical variator lens for optically changing a magnification of an image, a camera device having electronic variator means for electronically enlarging an image by signal processing, a lens-device-side variator operating member, and a camera-device-side variator operating member. In this camera system, when the aforesaid optical variator lens is operated, the aforesaid optical variator lens is controlled in the aforesaid lens device according to information for operating the aforesaid lens-device-side and camera-device-side variator operating members. Further, when the aforesaid electronic variator means is operated, the aforesaid electronic variator means is controlled in the aforesaid camera device according to information for operating the aforesaid lens-device-side and camera-device-side variator operating members. Moreover, during the aforesaid electronic variator means is operated, a signal causing the aforesaid lens device to inhibit the aforesaid optical variator lens from operating is transmitted to the aforesaid lens device.

Furthermore, according to still another aspect of the present invention, there is provided a lens device which comprises variator lens means for performing a zooming operation, control means for controlling the zooming operation of the aforesaid variator lens means, and signal output means for outputting an electronic zooming enabling signal and an electronic zooming preparation signal for giving advance notice of the electric zooming enabling signal, during the zooming operation.

Moreover, according to yet another aspect of the present invention, there is provided an imaging apparatus which comprises imaging means for imaging an object and for outputting an image signal, electronic zooming means for electronically enlarging an image represented by the image signal, signal input means for receiving an electronic zooming preparation permission signal and an electronic zooming enabling signal, and control means for enabling control of the aforesaid electronic zooming means when each of the electronic zooming preparation permission signal and the electronic zooming enabling signal is received.

Further, according to still another aspect of the present invention, there is provided an imaging system which comprises a lens device having a variator lens means for performing a zooming operation, first control means for controlling the zooming operation of the aforesaid variator lens means, and signal output means for outputting an electronic zooming enabling signal and an electronic zooming preparation permission signal which gives advance notice of the electric zooming enabling signal, during the zooming operation, and which further comprises an imaging apparatus having imaging means for imaging an object and for outputting an image signal, electronic zooming means for performing electronic enlargement processing on an image represented by the image signal, signal input means for receiving an electronic zooming preparation permission signal and an electronic zooming enabling signal, and second control means for enabling control of the aforesaid electronic zooming means when each of the electronic zooming preparation permission signal and the electronic zooming enabling signal is received.

Furthermore, according to yet another aspect of the present invention, there is provided a computer readable storage medium for storing a program causing a computer to execute the steps of controlling a zooming operation performed by a variator lens, and outputting an electronic zooming enabling signal and an electronic zooming preparation permission signal which gives advance notice of the electric zooming enabling signal, during the zooming operation.

Moreover, according to still another aspect of the present invention, there is provided a computer readable storage medium for storing a program causing a computer to execute the steps of imaging an object and outputting an image signal, performing electronic zooming for electronically enlarging an image represented by the image signal, receiving an electronic zooming preparation permission signal and an electronic zooming enabling signal, and enabling the electronic zooming when each of the electronic zooming preparation permission signal and the electronic zooming enabling signal is received.

Further, according to yet another aspect of the present invention, there is provided an imaging apparatus which comprises imaging means, electronic zooming means for enlarging an image taken by the aforesaid imaging means, zoom input means for receiving zoom operating information, lens information input means for receiving first zoom information, which indicates presence or absence of an optical zooming mechanism in an external lens means, and second zoom information which indicates presence or absence of an optical zooming mechanism, which does not operate in response to a control signal received from an external device, in the aforesaid external lens means, control output means for outputting an optical zooming control signal which instructs the aforesaid external lens means to perform a zooming operation and control means for controlling the aforesaid optical zooming mechanism of the aforesaid external lens means through the aforesaid electronic zooming means and the aforesaid lens control output means according to the zoom operating information inputted to the aforesaid zoom input means in such a manner as to be able to be driven, in a case that the first zoom information indicates the presence of the aforesaid optical zooming mechanism and that the second zoom information indicates the absence of the aforesaid optical zooming mechanism, and for controlling the aforesaid electronic zooming means in such a manner as to be able to be driven, in a case that the first zoom information indicates the absence of the aforesaid optical zooming mechanism, and for controlling the aforesaid electronic zooming means in such a manner as not to be driven, in a case that the second zoom information indicates the presence of the aforesaid optical zooming mechanism.

Furthermore, according to still another aspect of the present invention, there is provided an imaging apparatus which comprises imaging means, electronic zooming means for enlarging an image taken by the aforesaid imaging means, zoom input means for receiving zoom operating information, lens information input means for receiving zoom information, which indicates presence or absence of an optical zooming mechanism in an external lens means, and specific lens group information which indicates whether the aforesaid external lens means belongs to a specific lens group, control output means for outputting an optical zooming control signal which instructs the aforesaid external lens means to perform a zooming operation, and control means for controlling the aforesaid optical zooming mechanism of the aforesaid external lens means through the aforesaid electronic zooming means and the aforesaid lens control output means according to the zoom operating information inputted to the aforesaid zoom input means in such a manner as to be able to be driven, in a case where the zoom information indicates the presence of the aforesaid optical zooming mechanism and where the specific lens group information indicates that the aforesaid external lens means does not belong to the aforesaid specific lens group, and for controlling the aforesaid electronic zooming means in such a manner as to be able to be driven, in a case where the zoom information indicates the absence of the aforesaid optical zooming mechanism, and for controlling the aforesaid electronic zooming means in such a manner as not to be driven, in a case where the specific lens group information indicates that the aforesaid external lens means belongs to the aforesaid specific lens group.

Other features, objects and advantages of the present invention will become apparent from the following description of preferred embodiments with reference to the drawings in which like reference characters designate like or corresponding parts throughout several views.

DESCRIPTION OF THE PREFERRED EMBODIMENT

Hereinafter, the preferred embodiments of the present invention will be described in detail with reference to the accompanying drawings.

First Embodiment

Figure 3:
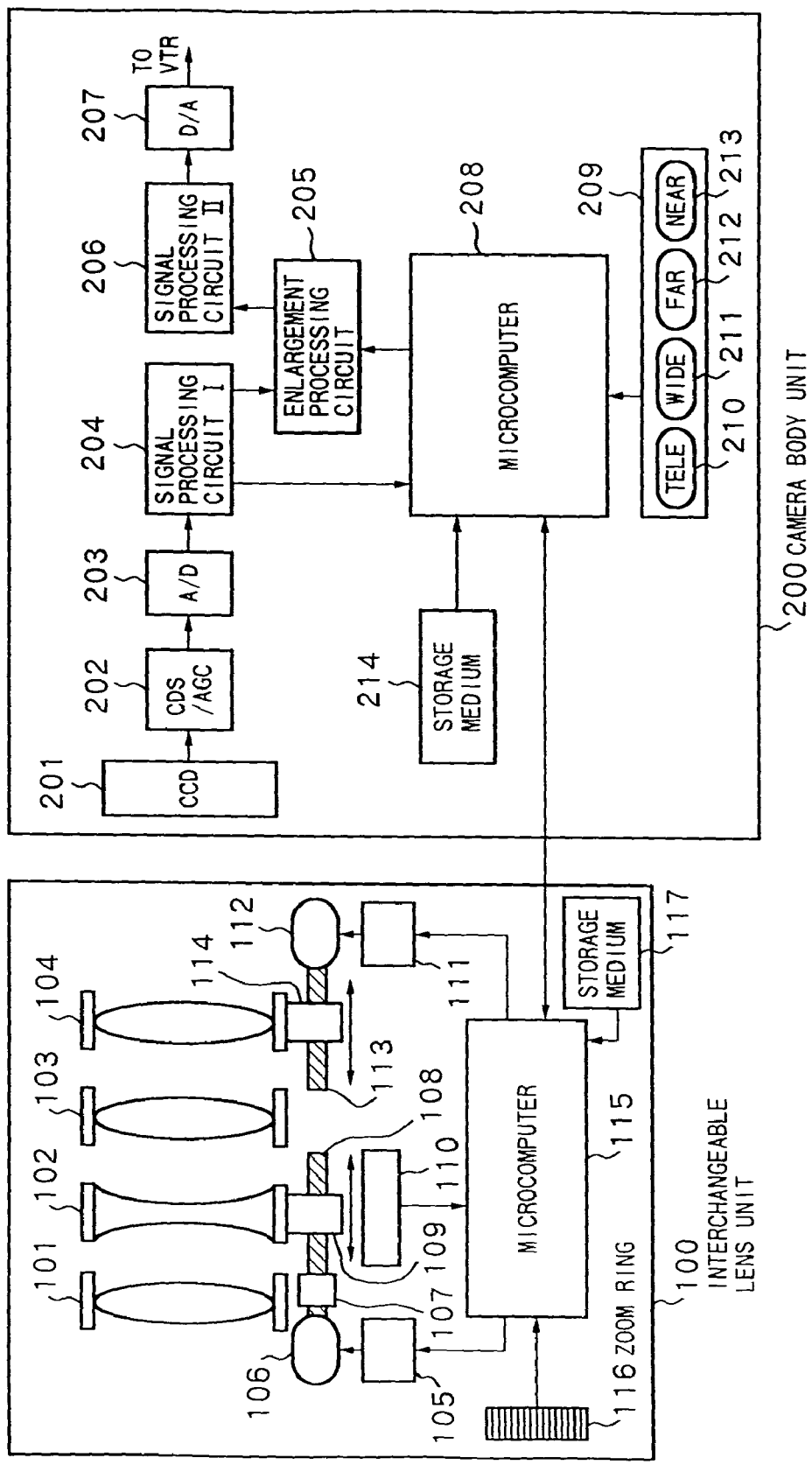
FIG. 3 is a block diagram showing the configuration of a lens-interchangeable video camera according to the first embodiment of the present invention.
Figure 4:
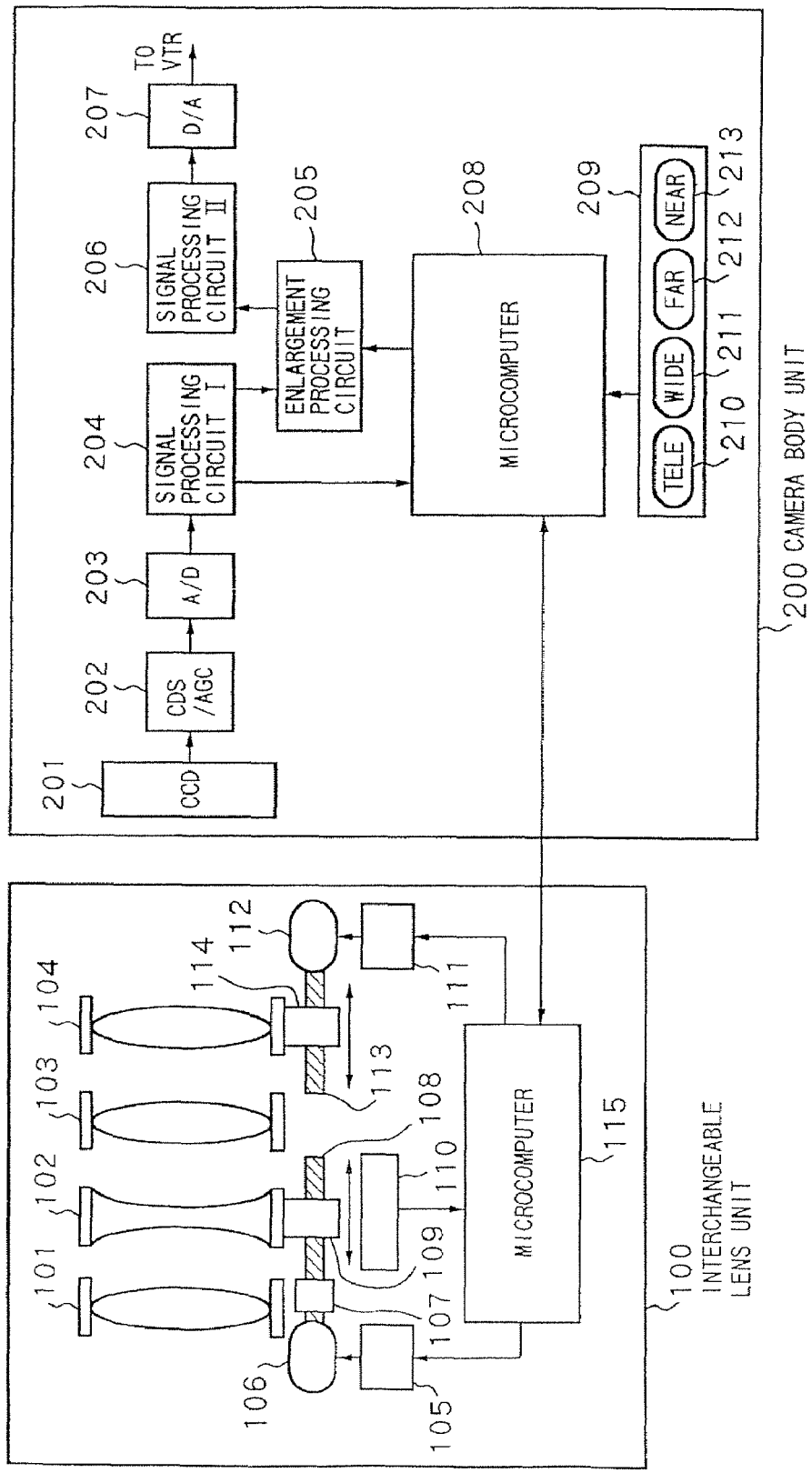
FIG. 4 is a block diagram showing the configuration of the conventional lens-interchangeable video camera.
Figures 5A, 5B:
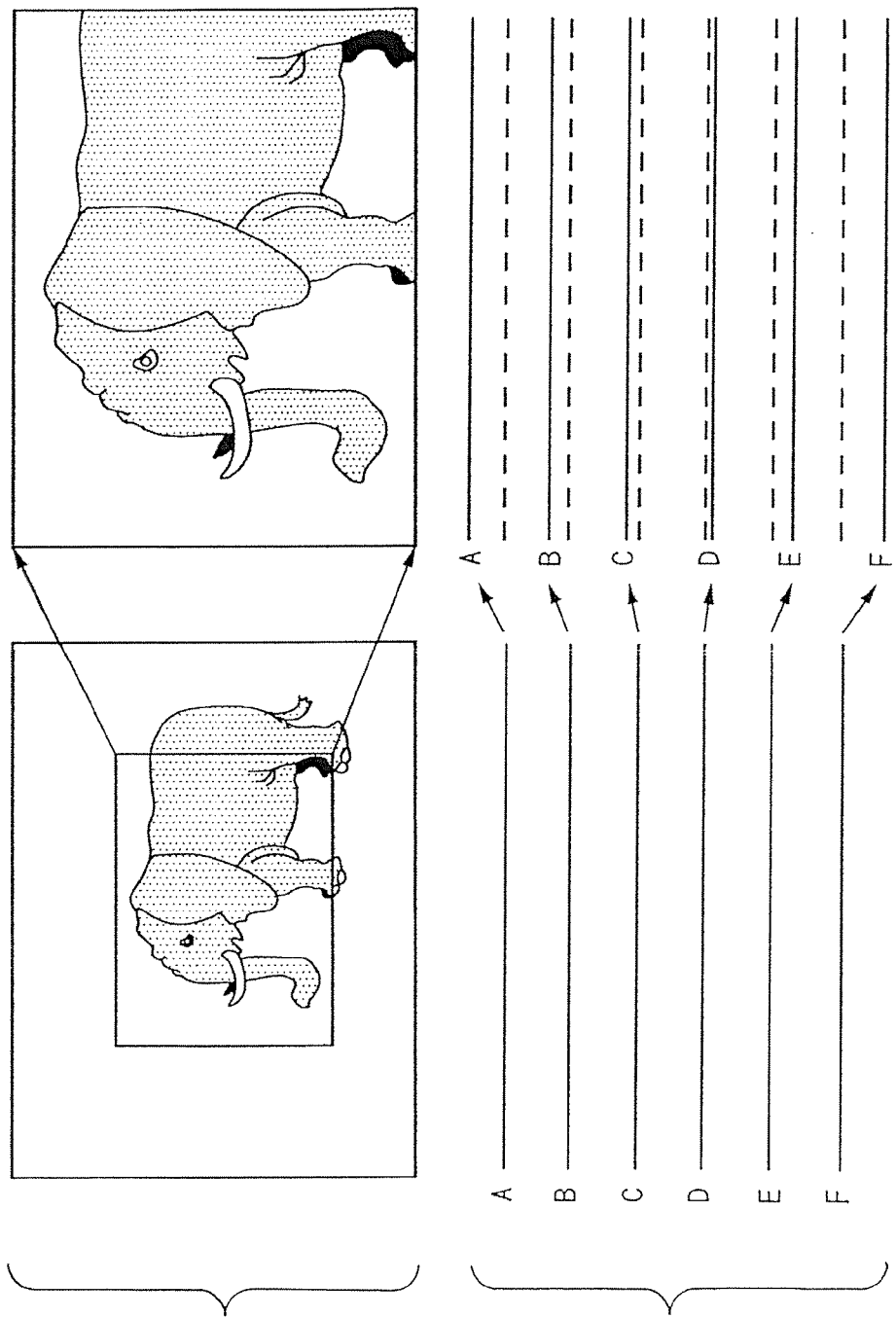
FIGS. 5A and 5B are diagrams illustrating electronic zooming by the conventional video camera.
Figure 6:
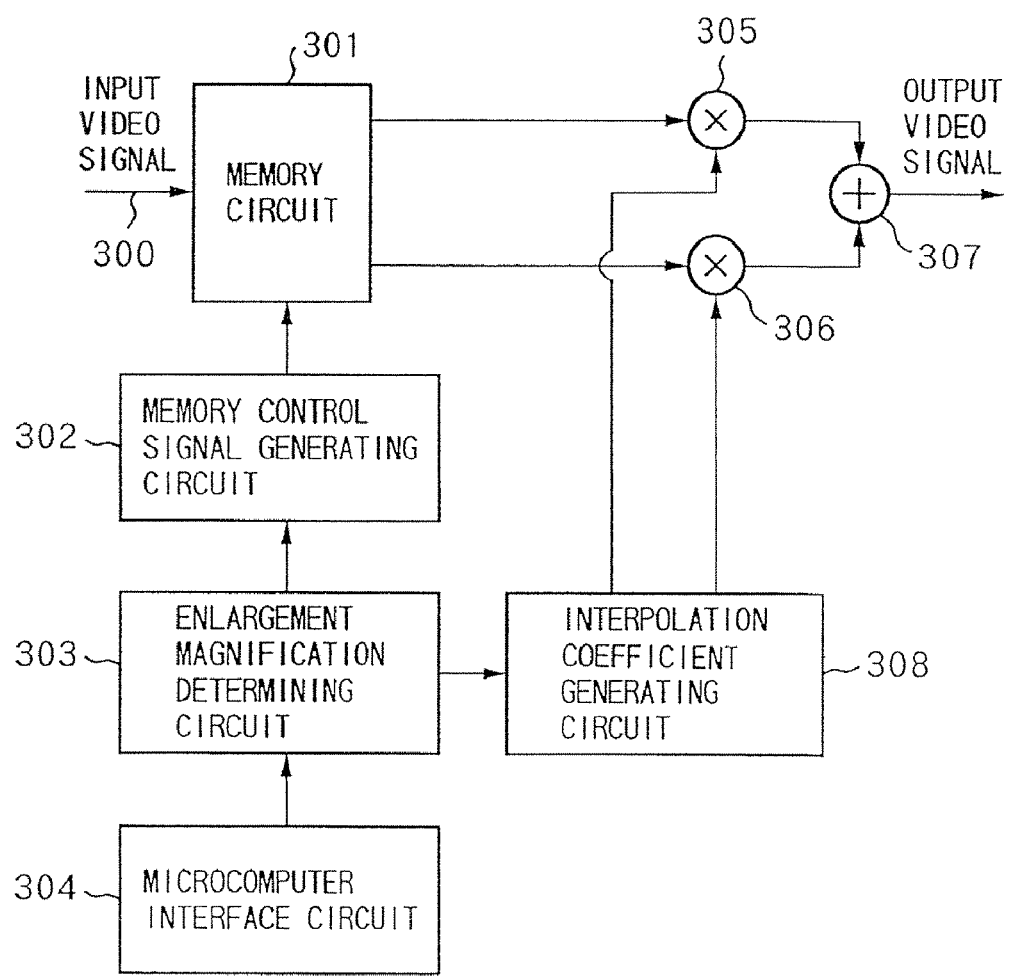
FIG. 6 is a block diagram showing the configuration of the enlargement processing circuit of the conventional video camera.

A lens-interchangeable video camera used for the first embodiment of the present invention is constituted as illustrated in FIG. 3. In FIGS. 3 and 4, same reference numerals designate substantially the same constituent elements. Operating information of a zoom ring 116 (lens-side zoom key information) is inputted to a lens microcomputer 115. It is detected in the lens microcomputer 115 which of tele-side and wide-side zooming directions corresponds to a direction in which the zoom ring 116 is operated.

Figure 1:
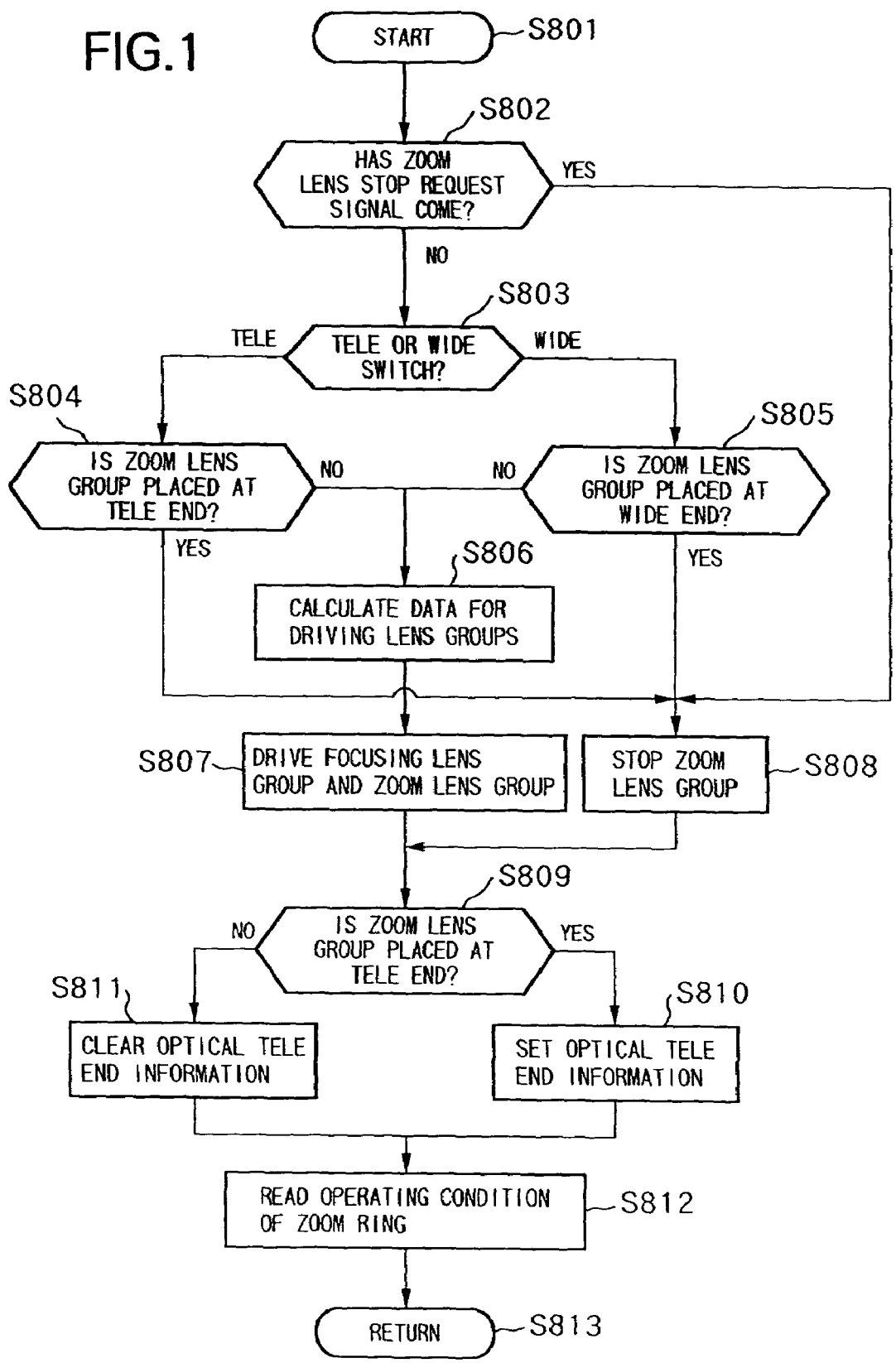
FIG. 1 is a flowchart illustrating processing concerning a zooming operation, which is performed by a lens microcomputer of a first embodiment of the present invention.
Figure 2:
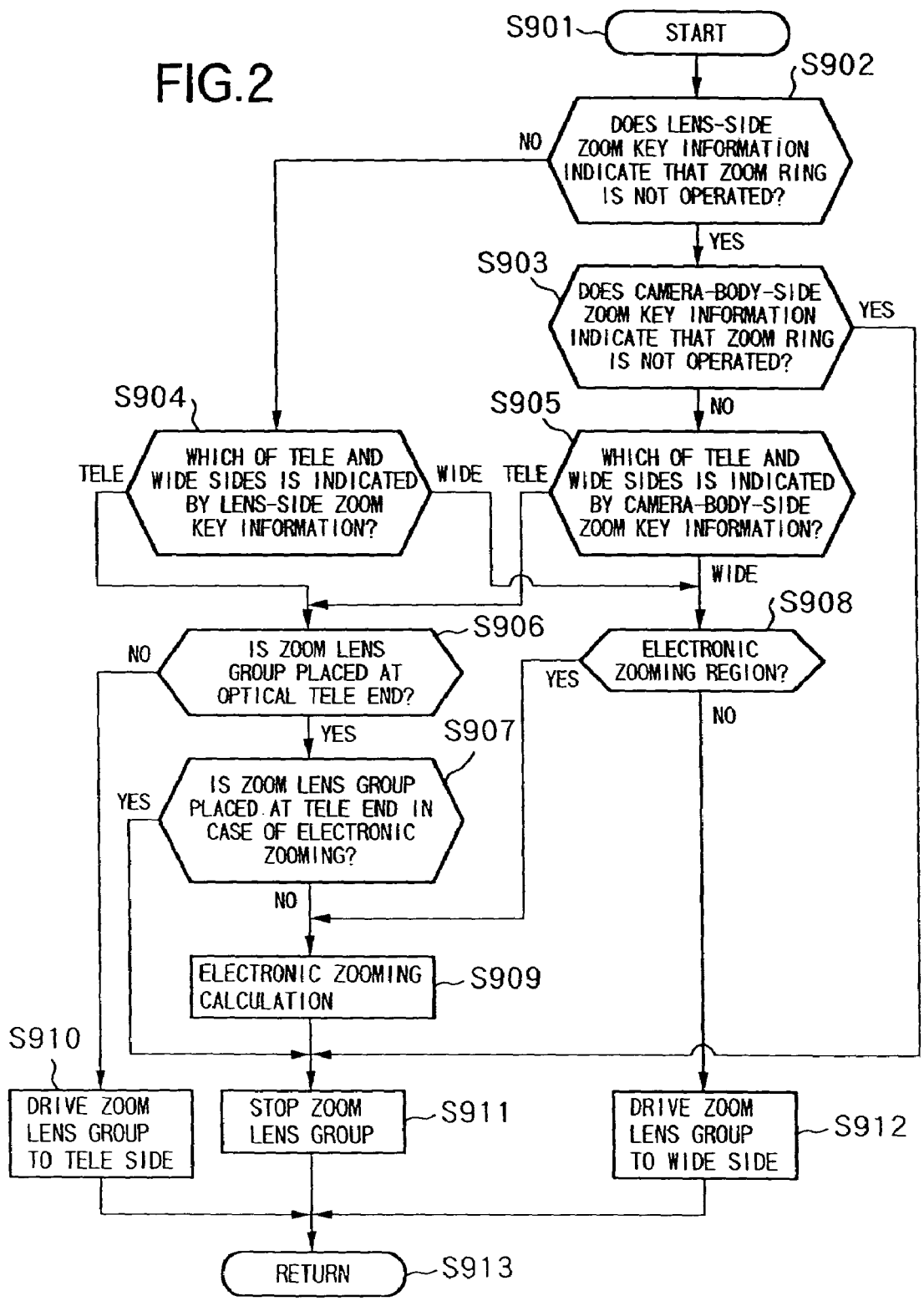
FIG. 2 is a flowchart illustrating processing concerning a zooming operation, which is performed by a camera microcomputer of the first embodiment of the present invention.
Figure 7:
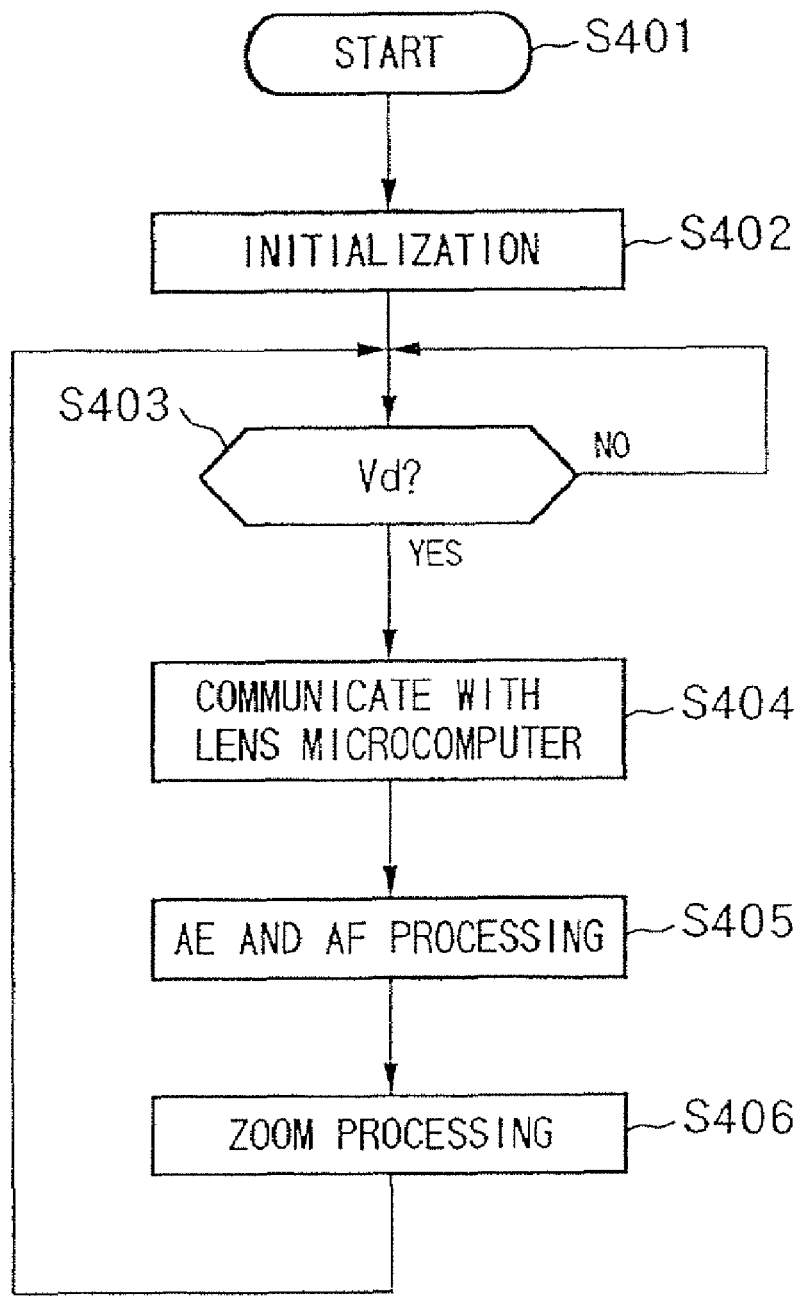
FIG. 7 is a flowchart illustrating the processing to be performed by the camera microcomputer of the conventional video camera.
Figure 8:
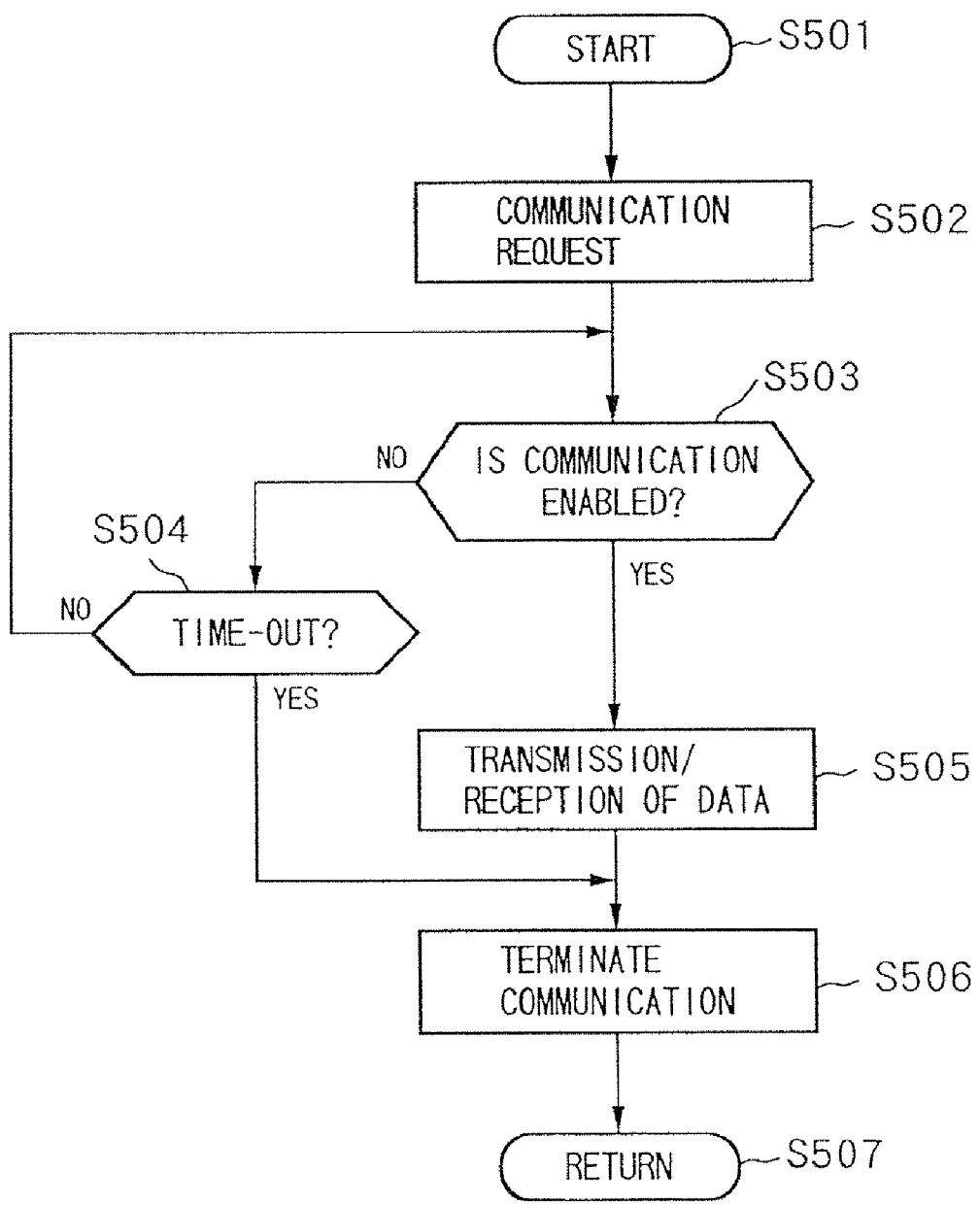
FIG. 8 is a flowchart illustrating the processing concerning communication to be performed by the camera microcomputer of the conventional video camera.
Figure 9:
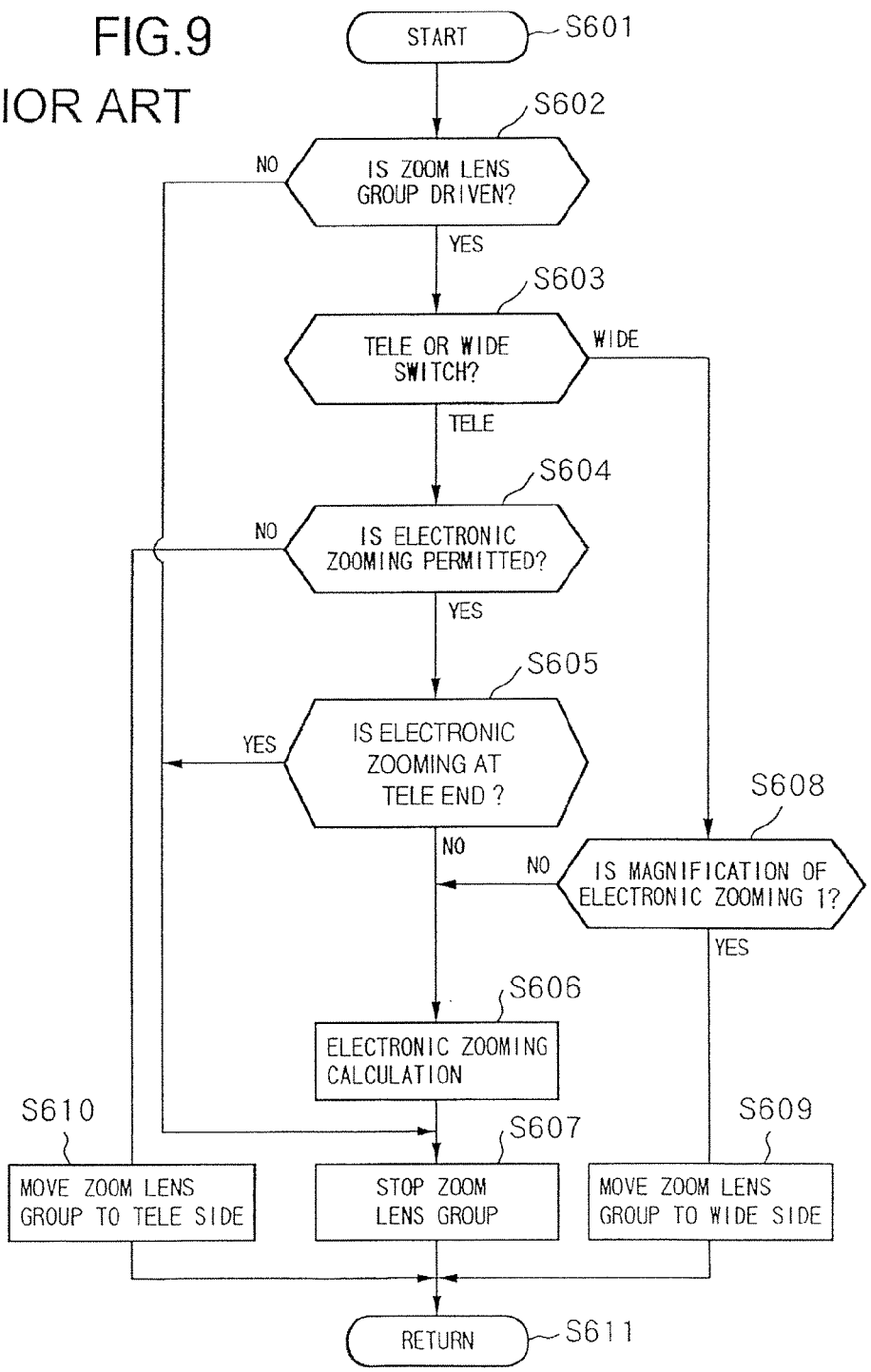
FIG. 9 is a flowchart illustrating the processing concerning zooming to be performed by the camera microcomputer of the conventional video camera.
Figure 10:
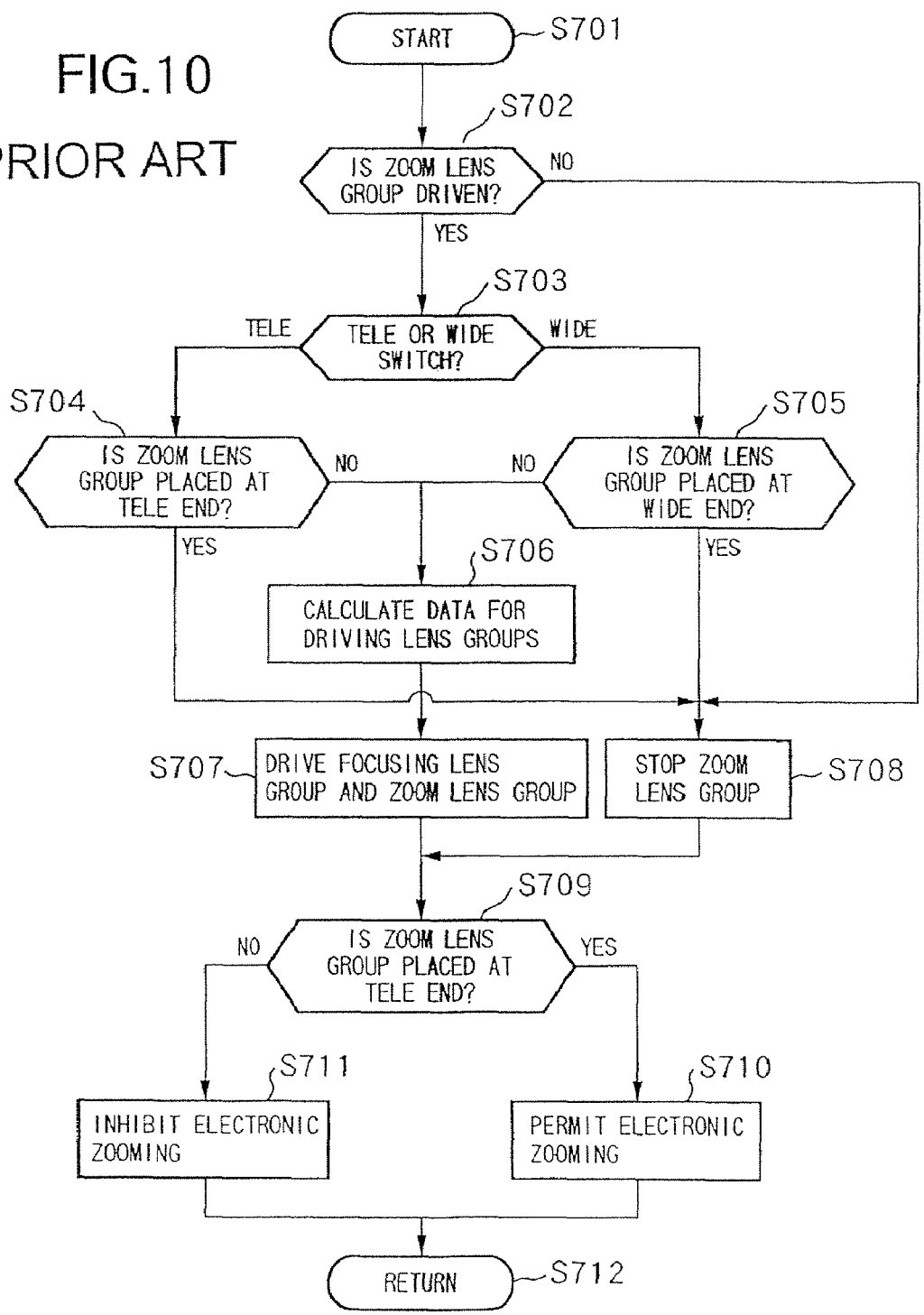
FIG. 10 is a flowchart illustrating the processing concerning zooming to be performed by the lens microcomputer of the conventional video camera.

Further, a program for performing processing in the lens microcomputer 115 according to the flowchart of FIG. 1 is stored in a storage medium 117. Moreover, programs for performing processing in the camera microcomputer 208 according to the flowcharts of FIGS. 2, 7 and 8 are stored in a storage medium 214. Semiconductor memories, optical disks, magneto-optic disks or magnetic media may be used as these storage media 117 and 214.

Next, processing to be performed by the lens microcomputer 115 of the first embodiment of the present invention will be described.

FIG. 1 is a flowchart illustrating processing concerning a zooming operation, which is a part of the entire processing to be performed by the lens microcomputer 115. In step 801, the processing is started. Then, in step 802, the lens microcomputer 115 checks whether a zoom lens stop request signal comes thereto from a camera microcomputer 208. If the zoom lens stop request signal has already come thereto, control proceeds to step 808. Otherwise, control advances to step 803 whereupon the lens microcomputer 115 checks according to the information sent by the camera microcomputer 208 which of the tele direction and the wide direction the moving direction of the zoom lens group is. If the moving direction of the zoom lens group is the tele direction, control proceeds to step 804. If the wide direction, control advances to step 805.

In step 804, the lens microcomputer 115 checks whether the zoom lens group is positioned at the tele end. If so, control proceeds to step 808. Otherwise, control advances to step 806. Further, in step 805, the lens microcomputer 115 checks whether the zoom lens group is positioned at the wide end. If so, control proceeds to step 808. Otherwise, control advances to step 806. The moving speed of the zoom lens group and the moving speed and direction of the focusing lens group are calculated in step 806. According to a result of this calculation, the zoom lens group and the focusing lens group are driven in step 807. Furthermore, in step 808, the zoom lens group is stopped.

Upon completion of the operation performed in step 807 or 808, the lens microcomputer 115 checks in step 809 whether the zoom lens group is placed at the tele end. If so, control proceeds to step 810. Otherwise, control advances to step 811. In step 810, the lens microcomputer 115 sends the camera microcomputer 208 an electronic zooming enabling signal. Further, in step 811, the lens microcomputer 115 sets optical tele end information to be sent to the camera microcomputer 208. Then, control proceeds to step 812. Furthermore, in step 811, the lens microcomputer 115 clears optical tele end information to be sent to the camera microcomputer 208. Then, control advances to step 812 whereupon the lens microcomputer 115 detects the operating condition of the zoom ring. Moreover, the lens microcomputer 115 provides a setting for sending the camera microcomputer 208 the lens-side zoom key information indicating that the zoom ring 116 is not operated, or that the zoom ring 116 is operated in a direction corresponding to the tele or wide side. Then, control proceeds to step 813. In this step, control returns to a main routine.

Next, processing to be performed in the camera microcomputer 208 of the first embodiment of the present invention will be described. The flow of the processing to be performed by the camera microcomputer 208 is broadly similar to the flow illustrated in FIGS. 7 and 8.

Step 406 of a process flow of the camera microcomputer 208 will be described in detail with reference to a flowchart of FIG. 2. In step 901, the processing is started. Then, in step 902, the camera microcomputer 208 checks the lens-side zoom key information sent from the lens microcomputer 115. If the zoom ring 116 is not operated, control advances to step 903. Otherwise, control proceeds to step 904 whereupon the camera microcomputer 208 further checks the lens-side zoom key information sent from the lens microcomputer 115. If the zoom ring 116 is operated in a direction corresponding to the tele side, control advances to step 906. If the zoom ring 116 is operated in a direction corresponding to the wide side, control proceeds to step 908. On the other hand, in step 905, the camera microcomputer 208 checks which of the switches 210 and 211 is pushed in the camera body unit 100. If the "TELE" switch 210 is pushed, control advances to step 906. Conversely, if the "WIDE" switch 211 is pushed, control proceeds to step 908.

In step 906, the camera microcomputer 208 judges from optical tele end information sent from the lens microcomputer 115 whether the zoom lens group is positioned at the optical tele end. If so, control advances to step 907. Otherwise, control proceeds to step 910. Then, in step 907, the camera microcomputer 208 checks whether the zoom lens group is placed at the tele end in the case of electronic zooming. If so, control advances to step 911. Otherwise, control proceeds to step 909. On the other hand, in step 908, the camera microcomputer 208 checks whether an electronic zooming operation is currently being performed. If so, control advances to step 909. Otherwise, control proceeds to step 912.

In this step 912, the camera microcomputer 208 establishes a setting for sending the lens microcomputer 115 a request signal to be used for moving the zoom lens group to the wide side. Further, in step 909, an electronic zooming operation is performed by increasing or decreasing the aforementioned interpolation coefficients according to which of the switches 210 and 211 is pushed. Moreover, the camera microcomputer 208 controls the enlargement processing circuit 205 according to a result of the electronic zooming operation. Then, control advances to step 911 whereupon the camera microcomputer 208 provides a setting for sending the lens microcomputer 115 a zoom lens stop request signal. On the other hand, the camera microcomputer 208 establishes a setting for sending the lens microcomputer 115 a request signal to be used for moving the zoom lens group to the tele side. Upon completion of the operation to be performed in one of the aforementioned steps 910, 911 and 912, control returns to the main routine in step 913.

Incidentally, it has been described that this embodiment is adapted to detect the zoom operating direction (namely, detect that the zoom lens group is operated toward the tele side or toward the wide side). However, the present invention is easily applied to a case that the camera has multizooming-speed in each zoom operating direction.

Further, even in the case that the camera body unit has a plurality of zoom operating means or that an external input device, such as a remote control device, for a camera body unit has zoom lens operating means, the present invention is easily applied to such a case by handling these means as a single zoom operating means in the camera body unit.

As described above, according to the first embodiment, even if a zoom operating means such as a zoom ring is provided therein, the operating information and the zoom position information are outputted to an external camera. Moreover, a zooming operation is performed according to control information provided by the camera. At that time, the control information is generated in the camera body unit according to the operating information, the zoom position information and zoom operating information produced by a zooming operation of the camera body unit. Thus, even if the zoom operating means are provided in both the lens unit and the camera body unit, respectively, the camera smoothly performs suitable zooming control operations.

Furthermore, according to the first embodiment, the operating information and the zoom position information are generated by a zooming operation of the lens unit and inputted to the camera body unit. Then, optical zooming control information is generated according to such inputted information and internal zoom operating information produced by the camera body unit. Subsequently, the optical zooming control information is sent to the lens unit. Thus, even if the zoom operating means are provided in both the lens unit and the camera body unit, respectively, the camera smoothly performs suitable zooming control operations. Furthermore, the camera suitably performs electronic zooming according to the aforementioned information.

Second Embodiment

A lens-interchangeable video camera used in this second embodiment is constructed in such a manner as to be similar to the video camera used in the first embodiment illustrated in FIG. 3. The video camera of the second embodiment is different from that of the first embodiment only in operations thereof. Thus, only the difference therebetween will be described.

In the case of a video camera in which a zoom ring 116 to be used for manually performing a zooming operation is provided in an interchangeable lens unit 100 as shown in FIG. 3, an operating condition thereof caused by switches is not uniquely determined. Thus, such a video camera has the problem that it is difficult to achieve suitable and smooth control of optical and electronic zooming operations. The second embodiment aims at solving this problem.

Hereinafter, the second embodiment will be described with reference to the accompanying drawings.

Figure 11:
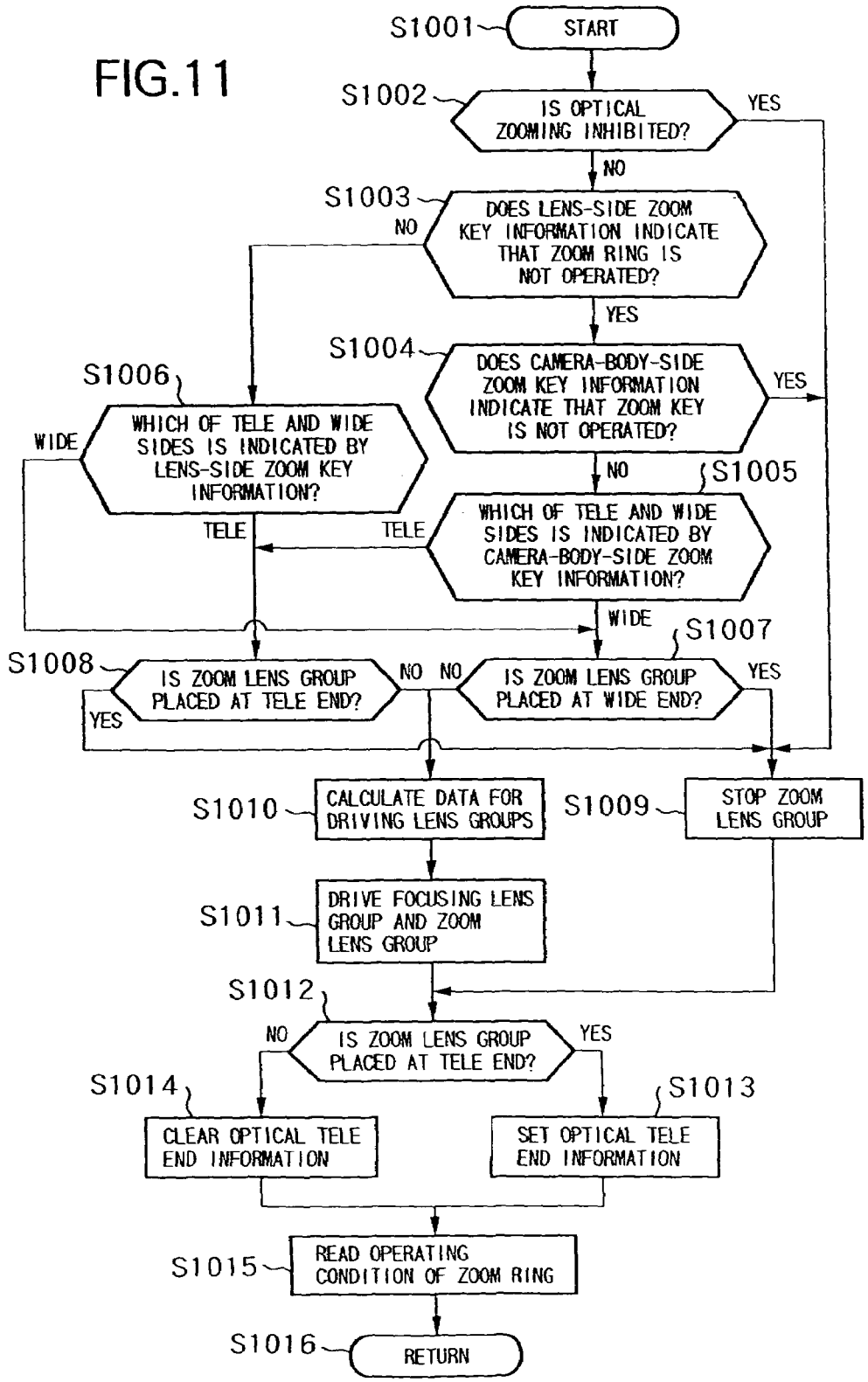
FIG. 11 is a flowchart illustrating processing concerning zooming to be performed by a lens microcomputer of a second embodiment of the present invention.
Figure 12:
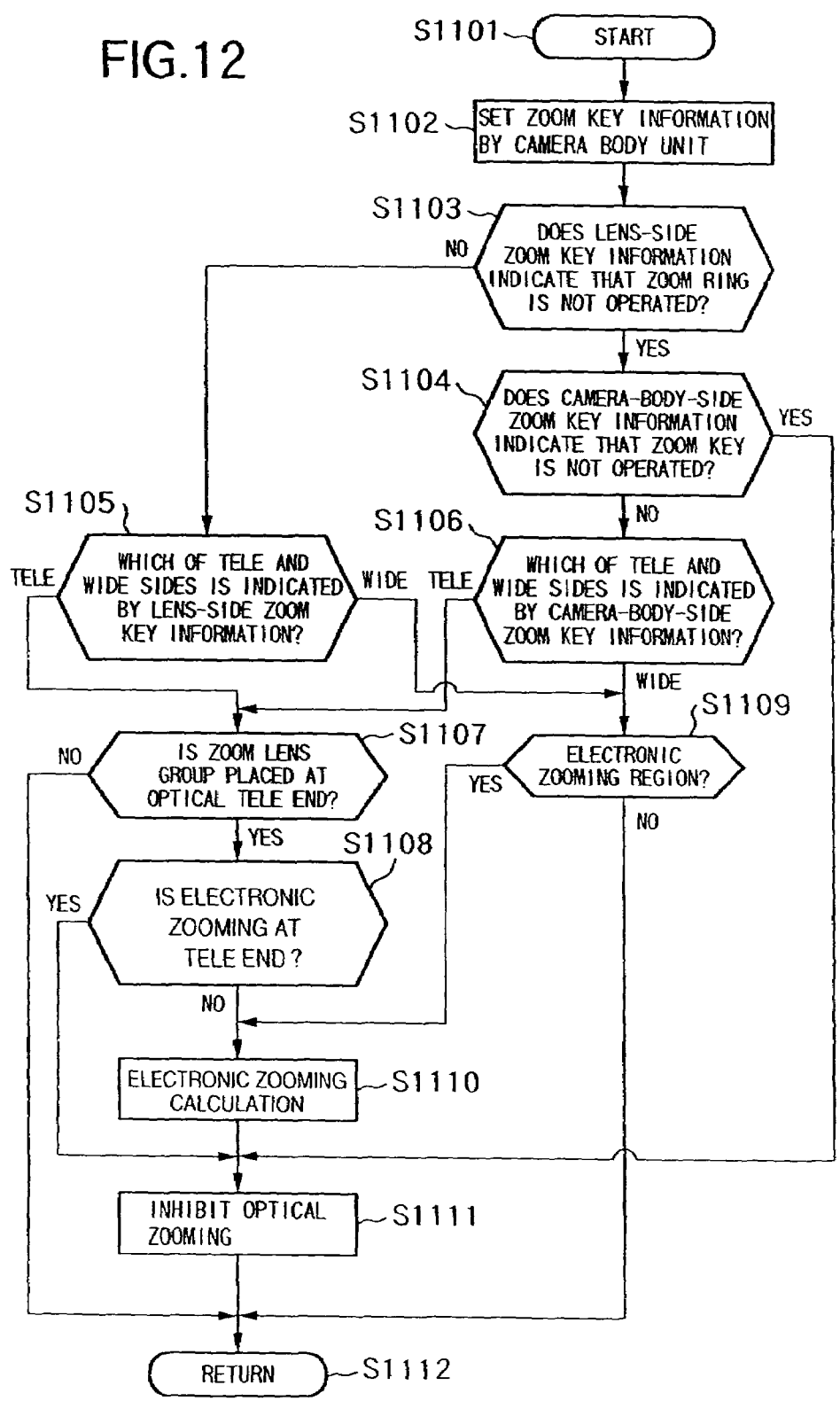
FIG. 12 is a flowchart illustrating processing concerning zooming to be performed by a camera microcomputer of the second embodiment of the present invention.

In the case of the second embodiment, a program for performing processing, which includes an operation to be performed in the lens microcomputer 115 according to the flowchart of FIG. 11, is stored in a storage medium 117 shown in FIG. 3. Moreover, programs for performing processing in the camera microcomputer 208 according to the flowcharts of FIGS. 12, 7 and 8 are stored in a storage medium 214. Se conductor memories, optical disks, magneto-optic disks or magnetic media may be used as these storage media 117 and 214.

Next, processing to be performed in the lens microcomputer 115 of the second embodiment of the present invention will be described.

FIG. 11 is a flowchart illustrating processing concerning a zooming operation, which is a part of the entire processing to be performed by the lens microcomputer 115. In step 1001, the processing is started. Then, in step 1002, the lens microcomputer 115 checks whether an optical zooming inhibition signal comes thereto from a camera microcomputer 208. If the optical zooming inhibition signal has already come thereto, control proceeds to step 1009. Otherwise, control advances to step 1003 whereupon the lens microcomputer 115 checks whether a zoom ring 110 of the interchangeable lens unit 100 is operated. If so, control proceeds to step 1006. Otherwise, control advances to step 1004.

In step 1004, the lens microcomputer 115 checks according to the information sent by the camera microcomputer 208 whether zoom switches 210 and 211 of a camera body unit 200 are operated. If so, control proceeds to step 1005. Otherwise, control advances to step 1009. In step 1005, the lens microcomputer 115 judges from the information sent by the camera microcomputer 208 which of the tele direction and the wide direction the operating direction in which the zoom lens group is operated. If such an operating direction of the zoom lens group is the tele direction, control proceeds to step 1008. If the wide direction, control advances to step 1007. On the other hand, in step 1006, the lens microcomputer 115 judges which of the tele direction and the wide direction corresponds to the operating direction in which the zoom ring 116 is operated. If such an operating direction of the zoom ring 116 corresponds to the tele direction, control proceeds to step 1008. If corresponding to the wide direction, control advances to step 1007.

In step 1008, the lens microcomputer 115 checks whether the zoom lens group is positioned at the tele end. If so, control proceeds to step 1009. Otherwise, control advances to step 1010. Further, in step 1007, the lens microcomputer 115 checks whether the zoom lens group is positioned at the wide end. If so, control proceeds to step 1009. Otherwise, control advances to step 1010. The moving speed of the zoom lens group and the moving speed and direction of the focusing lens group are calculated in step 1010. According to a result of this calculation, the zoom lens group and the focusing lens group are driven in step 1011.

Furthermore, in step 1009, the zoom lens group is stopped.

Upon completion of the operation performed in step 1009 or 1011, the lens microcomputer 115 checks in step 1012 whether the zoom lens group is placed at the tele end. If so, control proceeds to step 1013. Otherwise, control advances to step 1014. In step 1013, the lens microcomputer 115 sets optical tele end information to be sent to the camera microcomputer 208. Then, control proceeds to step 1015. Furthermore, in step 1014, the lens microcomputer 115 clears optical tele end information to be sent to the camera microcomputer 208. Then, control advances to step 1015 whereupon the lens microcomputer 115 detects the operating condition of the zoom ring 116. Moreover, the lens microcomputer 115 provides a setting for sending the camera microcomputer 208 the lens-side zoom key information indicating that the zoom ring 116 is not operated, or that the zoom ring 116 is operated in a direction corresponding to the tele or wide side. Then, control proceeds to step 1016. In this step, control returns to a main routine.

Next, processing to be performed in the camera microcomputer 208 of the second embodiment of the present invention will be described. The flow of the processing to be performed by the camera microcomputer 208 is broadly similar to the flow illustrated in FIGS. 7 and 8.

Step 406 of a process flow of the camera microcomputer 208 will be described in detail with reference to a flowchart of FIG. 12. In step 1101, the processing is started. Then, in step 1102, the camera microcomputer 208 checks the zoom switches 210 and 211 of the camera body unit 100. Further, the camera microcomputer 208 makes preparations for sending the lens microcomputer 115 a signal indicating that the zoom switches 210 and 211 are not operated or that the zoom switches 210 and 211 are operated in the tele or wide direction.

In step 1103, the camera microcomputer 208 checks the lens-side zoom key information sent from the lens microcomputer 115. If the zoom ring 116 is not operated, control advances to step 1104. Otherwise, control proceeds to step 1105 whereupon the camera microcomputer 208 further checks the lens-side zoom key information sent from the lens microcomputer 115. If the zoom ring 116 is operated in a direction corresponding to the tele side, control advances to step 1107. If the zoom ring 116 is operated in a direction corresponding to the wide side, control proceeds to step 1109. On the other hand, in step 1104, the camera microcomputer 208 checks whether the switches 210 and 211 are pushed in the camera body unit 100. If so, control advances to step 1106. Otherwise, control proceeds to step 1111. In step 1106, the camera microcomputer 208 checks which of the switches 210 and 211 is pushed in the camera body unit 100. If the "TELE" switch 210 is pushed, control advances to step 1107. Conversely, if the "WIDE" switch 211 is pushed, control proceeds to step 1109.

In step 1107, the camera microcomputer 208 judges from optical tele end information sent from the lens microcomputer 115 whether the zoom lens group is positioned at the optical tele end. If so, control advances to step 1108. Otherwise, control proceeds to step 1112. Then, in step 1108, the camera microcomputer 208 checks whether the zoom lens group is placed at the tele end in the case of electronic zooming. If so, control advances to step 1111. Otherwise, control proceeds to step 1110. On the other hand, in step 1109, the camera microcomputer 208 checks whether an electronic zooming operation is currently being performed. If so, control advances to step 1110. Otherwise, control proceeds to step 1112.

In step 1110, an electronic zooming operation is performed by increasing or decreasing the aforementioned interpolation coefficients according to which of the switches 210 and 211 is pushed. Moreover, the camera microcomputer 208 controls an enlargement processing circuit 205 according to a result of the electronic zooming operation. Then, control advances to step 1111 whereupon the camera microcomputer 208 provides a setting for sending the lens microcomputer 115 an optical zooming inhibition signal.

Subsequently, control proceeds to step 1112 whereupon control returns to the main routine.

Incidentally, it has been described that the second embodiment is adapted to detect the zoom operating direction (namely, detect that the zoom lens group is operated toward the tele side or toward the wide side). However, the present invention is easily applied to a case that the camera has multi-zooming-speed in each zoom operating direction.

Further, even in the case that the camera body unit has a plurality of zoom operating means or that an external input device, such as a remote control device, for a camera body unit has zoom lens operating means, the present invention is easily applied to such a case by handling these means as a single zoom operating means in the camera body unit.

As described above, according to the second embodiment, even if a zoom operating means such as a zoom ring is provided therein, a zooming operation is controlled in accordance with the corresponding first operating information and the zoom position information and the zooming inhibition information. At that time, a zooming operation is controlled by the camera body unit according to the first operating information, the zoom position information and second zoom operating information produced by a zooming operation of the camera body unit. Thus, even if the zoom operating means are provided in both the lens unit and the camera body unit, respectively, the camera smoothly performs suitable zooming control operations.

Furthermore, according to the second embodiment, the first operating information and the zoom position information are generated by a zooming operation of the lens unit and inputted to the camera body unit. Thus, an electronic zooming operation is performed according to such inputted information and second zoom operating information produced by the camera body unit. Moreover, the second zoom operating information and the optical zooming control information are generated and sent to the lens unit. Thus, even if the zoom operating means are provided in both the lens unit and the camera body unit, respectively, the camera smoothly performs suitable zooming control operations.

Third Embodiment

Video cameras having both the optical zooming function and the electronic zooming function, similarly as the first and second embodiments, have the problem that it is difficult to smoothly switch between the optical zooming function and the electronic zooming function. Hereinafter, this problem will be described by taking the conventional video camera shown in FIG. 4 as an example.

Figure 13:
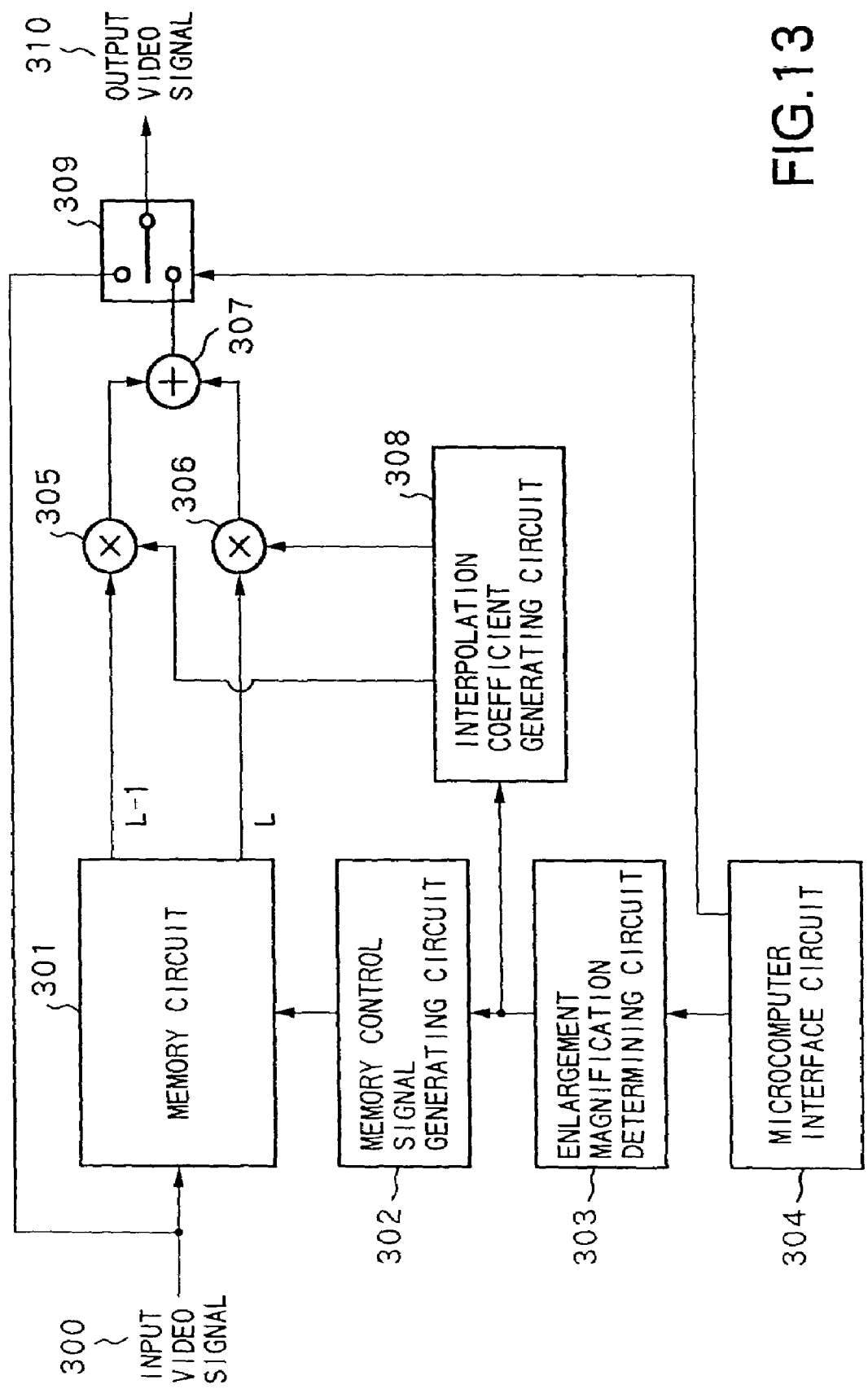
FIG. 13 is a block diagram showing another example of the configuration of the enlargement processing circuit of the conventional video camera.

FIG. 13 shows the configuration of the enlargement processing circuit 205 of the conventional video camera illustrated in FIG. 4. For simplicity of description, this figure illustrates only vertical enlargement processing.

As shown in FIG. 13, an input video signal 300 is stored in a memory circuit 301 under the control of a memory control signal generating circuit 302 and sent to an output switch circuit 309. Microcomputer interface circuit 304 receives an enlargement magnification and enlargement information from a camera microcomputer 208. Based on this, an enlarged magnification determining circuit 303 outputs the enlargement magnification to the memory control signal generating circuit 302 and an interpolation coefficient generating circuit 308. The memory control signal generating circuit 302 reads signals, which respectively represent an nth line and an (n−1)th line delayed by 1 H from the nth line, from the memory circuit 301. The interpolation coefficient generating circuit 308 generates interpolation coefficients corresponding to the enlargement magnification and gives the generated interpolation coefficients to multipliers 305 and 306. These multipliers multiply the signals, which respectively represent an nth line and an (n−1)th line, by the interpolation coefficients. Outputs of these multipliers are added up in an adder 307. Resultant signal is outputted therefrom to the output switch circuit 309. Then, the output switch circuit 309 outputs the signal sent from the adder 307 or the input video signal 300 according to a switch signal sent from the microcomputer interface circuit 304 as an output video signal 310.

However, in the conventional circuit, it is difficult to set the timing of the switching between optical zooming, which is performed in the interchangeable lens unit, and enlargement processing which is performed by utilizing the electronic zooming in the camera body unit. Moreover, for some reason, the conventional circuit has no means (for example, a process sequence) for discontinuing the enlargement processing in the camera body unit (for instance, in the case that the interchangeable lens unit has a zoom ring for mechanically moving the variator lens and that a gear has a slip mechanism for transmitting the movement of the zoom ring to the rotation shaft, a cameraman operates the zoom ring in a direction corresponding to the wide side).

Thus, in Japanese Unexamined Patent Publication No. 9-96756 Official Gazette, the inventors of the present invention have proposed devices to solve the aforementioned problem. Consequently, smooth switching between optical and electronic zooming operations is achieved. However, troubles, such as suspension of a zooming operation, may happen in the cases that a delay occurs in transmission of an electronic zooming inhibition or permission signal between the lens unit and the camera body unit due to some cause and that, after an electronic zooming enabling signal is received by the camera body unit, a delay occurs therein until electronic zooming is performed therein.

Hereinafter, this phenomenon will be described in detail.

Figure 14:
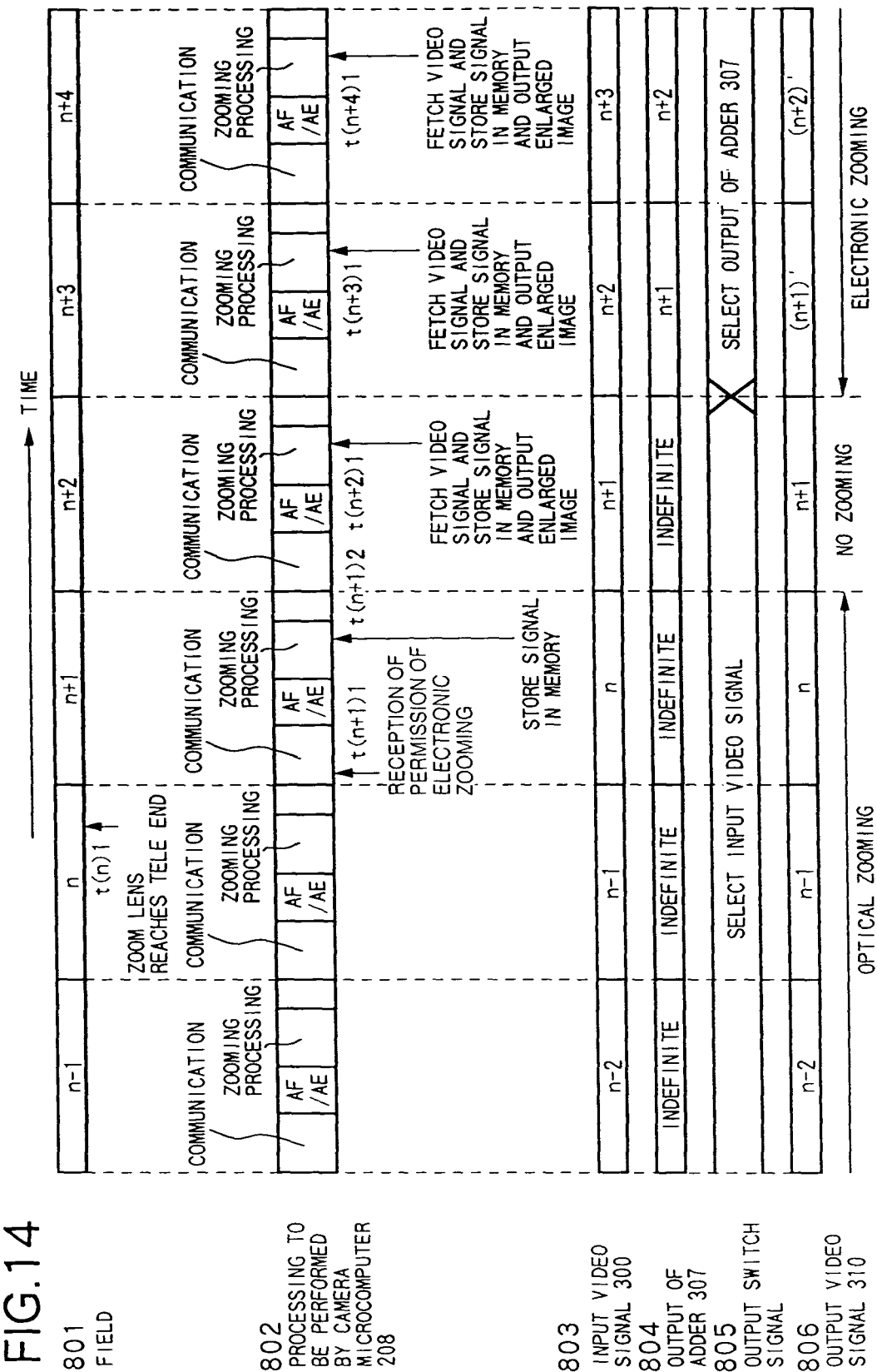
FIG. 14 is a diagram illustrating results of an actual zooming operation that is conducted according to processing performed by lens and camera microcomputers of the second embodiment of the present invention.

FIG. 14 is a diagram illustrating the timing with which an output video signal is changed from video signals of an optical zooming region to those of an electronic zooming region when a zooming operation is performed from the wide side to the tele side. In this diagram, the transverse axis represents time. As viewed in this diagram, the righter the position of a time point on the transverse axis becomes, the later time the time point indicates.

In FIG. 14, reference numeral 801 denotes a row representing a sequence of fields of a standard television signal. Fields (n−1) to (n+4) are shown in this figure. Reference numeral 802 designates a row showing various kinds of processing to be performed by the camera microcomputer 208 in the respective fields. The aforementioned kinds of processing illustrated in FIG. 7 are performed in the respective fields. Reference numeral 803 designates a row showing the field Nos. of fields in which the input video signals 300 are obtained by photoelectric conversion. Incidentally, a field, in which a video signal is read from an imager 201, is just subsequent to a field in which this video signal is obtained by photoelectric conversion. Thus, the field No. of this field is smaller than the field No. thereof shown in the row 801 by 1.

Reference numeral 804 designates a row showing the field No. of a field in which an output signal of the adder 307 is obtained in the imager 201 by photoelectric conversion. However, an output signal of the adder 307 is indefinite until a video signal is fetched in the memory circuit 301. After a video signal is fetched thereto, a signal delayed by 1 field is outputted from the adder 307. Reference numeral 805 denotes a row indicating which of the input video signal 300 and the output signal of the adder 307 is selected by the output switch circuit 309 according to a switch signal outputted from the microcomputer interface circuit 304 shown in FIG. 13. Reference numeral 806 designates a row indicating the field No. of a field in which the output video signal 310 is obtained in the imager 201 by photoelectric conversion.

Next, a process flow of the zooming processing will be described by concentrating on the processing to be performed by the camera microcomputer 208.

During the zooming operation from the wide side to the tele side, the lens microcomputer 115 prepares electronic zooming permission information for the next communication with the camera microcomputer 208 in the field n when the optical zoom lens reaches the optical tele end at the time t(n)1.

In the field (n+1), an electronic zooming enabling signal is sent from the lens microcomputer 115 to the camera microcomputer 208 by the communication performed at the time t(n)1. In the zooming processing at the time t(n+1)2, the camera microcomputer 208 performs an operation for causing the memory circuit 301 to store the input video signal in the time (n+2).

In the field (n+2), an operation for causing the input video signal 300 obtained in the field (n+3) to be stored in the memory circuit 301 is performed. Moreover, operations of enlarging an image, which is represented by the stored input video signal 300 in the field (n+2), in the field (n+3), and of outputting a video signal (n+1)' representing an enlarged image, and of selecting a received output of the adder 307 as an output of the output switch circuit 309.

In the field (n+3), an operation of storing the input video signal 300, which is obtained in the field (n+4), in the memory circuit 301 is performed during the zooming processing at the time t(n+3). Further, the circuit performs operations of enlarging an image, which is represented by the stored input video signal 300 in the field (n+2), in the field (n+3), and of outputting a video signal (n+1)' representing an enlarged image, and of selecting a received output of the adder 307 as an output of the output switch circuit 309. Further, the circuit performs operations of enlarging an image, which is represented by the stored input video signal 300 in the field (n+3), in the field (n+4), and of outputting a video signal (n+1)' representing an enlarged image, and of outputting a video signal (n+2)' to the output switch circuit 309. In and after the field (n+4), the same processing as performed in the field (n+3) is carried out.

Next, change 806 in the output video signal 310 with time will be described. Because the zoom lens reaches the optical tele end in the field "n", signals obtained in the imager 201 by photoelectric conversion in the fields up to (n−1) and signals obtained by photoelectric conversion in the field "n", in which the optical zooming is ceased in the middle thereof, are video signals obtained during the optical zooming. Thus, the output video signals outputted in the fields up to (n+1) are signals outputted during the optical zooming. Signals obtained in the field (n+1) by photoelectric conversion are outputted without change as the output video signal 310 in the field (n+2), and thus are neither signals obtained during the optical zooming, nor signals obtained during the electronic zooming. The output video signals 310 outputted in the field (n+3) and the subsequent fields are obtained by enlarging signals stored in the memory circuit 301 and are video signals obtained during the electronic zooming.

As is understood from the foregoing description, the zooming is suspended in the case that a time lag occurs between the reception of the electronic zooming enabling signal and the implementing of the electronic zooming in the camera body unit.

This third embodiment aims at solving the aforementioned problem and at achieving the smooth switching between the optical zooming and the electronic zooming.

Hereinafter, the third embodiment will be described with reference to the accompanying drawings.

Figure 15:
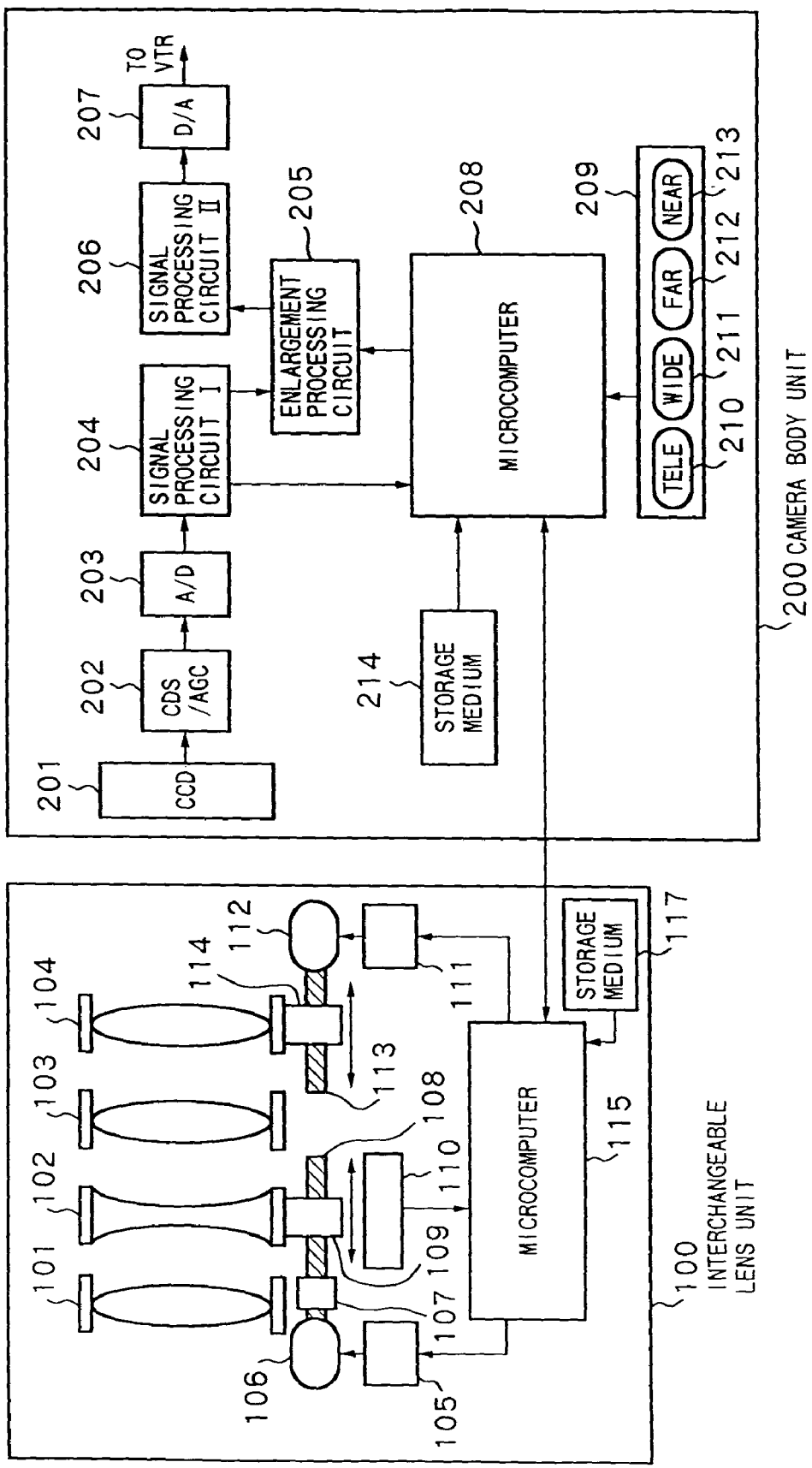
FIG. 15 is a block diagram showing the configuration of a lens-interchangeable video camera according to a third embodiment of the present invention.

A lens-interchangeable video camera used in the third embodiment is constructed in such a manner as to be similar to the video camera used in the first embodiment illustrated in FIG. 4. The video camera of the second embodiment is different from that of FIG. 4 only in that the video camera of this embodiment has storage media 117 and 214 as illustrated in FIG. 15. Further, the flow of the processing to be performed by the camera microcomputer 208 is broadly similar to the flow illustrated in FIGS. 7 and 8.

Figure 16:
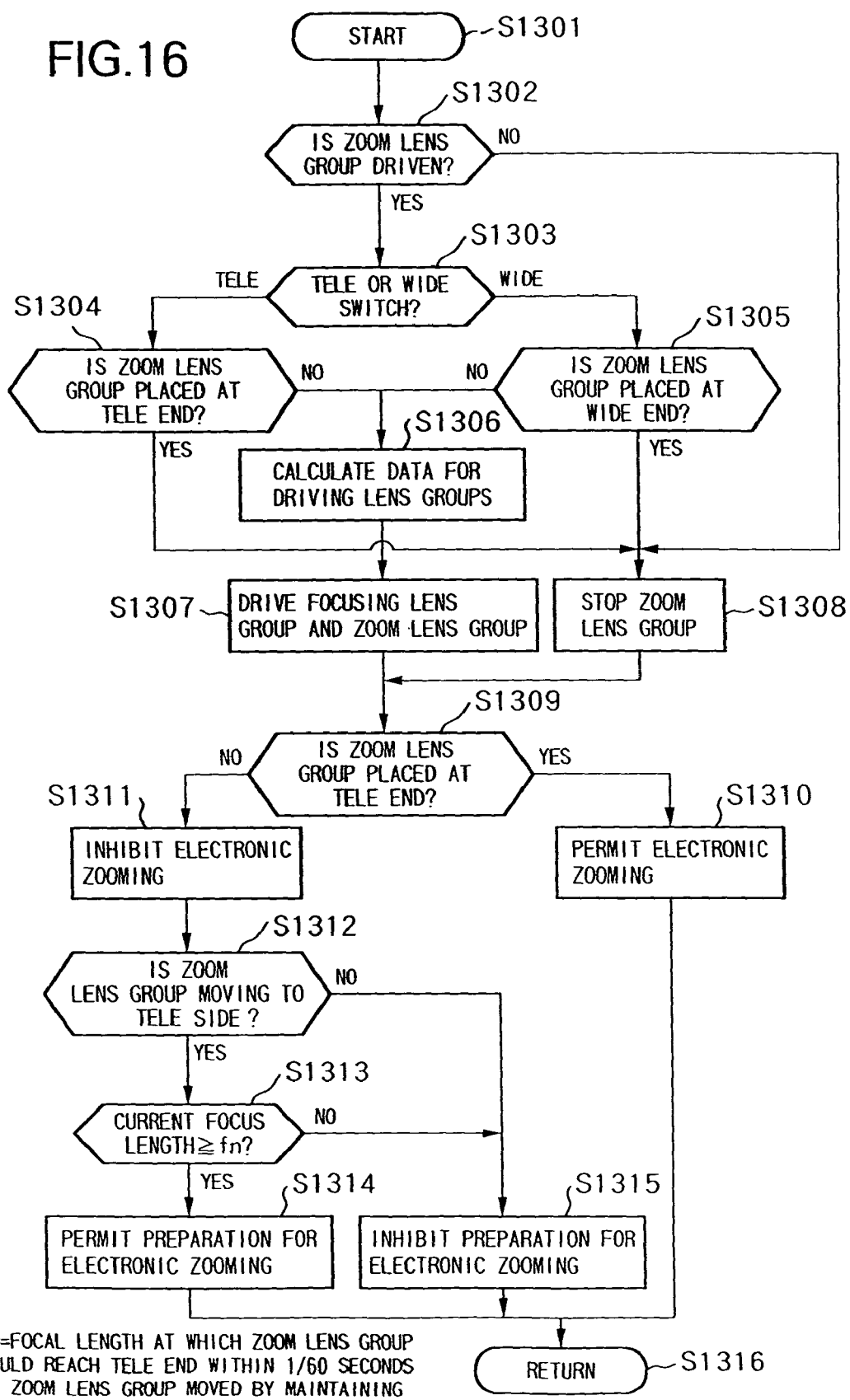
FIG. 16 is a flowchart illustrating processing concerning a zooming operation, which is performed by a lens microcomputer of the third embodiment of the present invention.

Further, the storage medium 117 stores a program for performing a process illustrated in a flowchart of FIG. 16, which is executed by the lens microcomputer 115. Moreover, the storage medium 117 stores a program for performing processes illustrated in flowcharts of FIGS. 17, 7 and 8, which are executed by the camera microcomputer 208. Semiconductor memories, optical disks, magneto-optic disks or magnetic media may be used as these storage media 117 and 214.

First, step 406 of a process flow (see FIG. 7) by the camera microcomputer 208 of the third embodiment of the present invention will be described in detail with reference to FIG. 17. Incidentally, in the following description, it is assumed that only the zoom switches 210 and 211 move the variator lens group 102.

Figure 17:
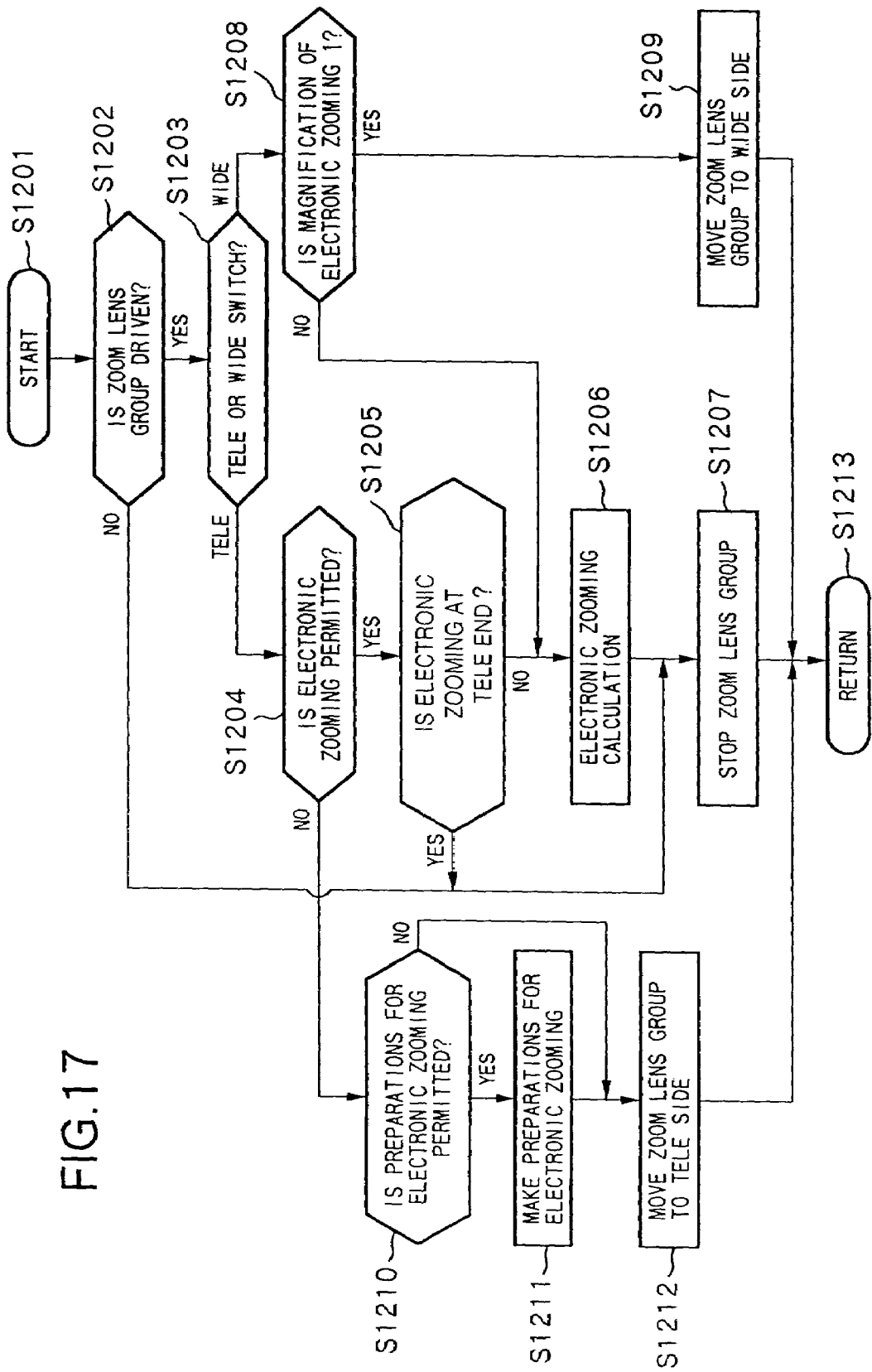
FIG. 17 is a flowchart illustrating processing concerning a zooming operation, which is performed by a camera microcomputer of the third embodiment of the present invention.

As shown in FIG. 17, in step 1201, the processing is started. Then, in step 1202, the camera microcomputer 208 checks whether a zooming operation is being performed. Subsequently, if both the zoom switches 210 and 211 are pushed, or if neither of these zoom switches is pushed, control advances to step 1207. If only one of these zoom switches is pushed, control proceeds to step 1203 whereupon the camera microcomputer 208 further checks which of the switches 210 and 211 is pushed. If the "TELE" switch 210 is pushed, control advances to step 1204. If the "WIDE" switch 211 is pushed, control proceeds to step 1208.

In step 1204, the camera microcomputer 208 judges whether electronic zooming permission information comes thereto from the lens microcomputer 115. If electronic zooming is permitted, control advances to step 1205. Otherwise, control proceeds to step 1210. In step 1205, the camera microcomputer 208 checks whether the zoom lens group is positioned at the optical tele end. If so, control advances to step 1207. Otherwise, control proceeds to step 1206 whereupon an electronic zooming operation is performed by increasing or decreasing the aforementioned interpolation coefficients according to which of the switches 210 and 211 is pushed. Moreover, the camera microcomputer 208 controls the enlargement processing circuit 205 according to a result of the electronic zooming operation. Then, in step 1207, the camera microcomputer 208 sends a zoom lens stop request signal to the lens microcomputer 115.

On the other hand, in step 1208, the camera microcomputer 208 checks whether an electronic zooming operation is currently being performed. If so, control advances to step 1206. Otherwise, in step 1209, the camera microcomputer 208 sends the lens microcomputer 115 a request signal for moving the zoom lens group in a direction corresponding to the wide side.

Further, in step 1210, the camera microcomputer 208 checks whether an electronic zooming preparation permission signal comes thereto from the lens microcomputer 115. If permitted, control advances to step 1211. Otherwise, control proceeds to step 1212. In step 1211, the camera microcomputer 208 makes preparations for starting the electronic zooming. Then, control advances to step 1212. Input image signal 300 is stored in the memory circuit 301 so that, owing to the preparations made in step 1211, an electronic zooming operation can be performed immediately after an electronic zooming permission signal comes from the lens microcomputer 115. In step 1212, the camera microcomputer 208 sends the lens microcomputer 115 a request signal to be used for moving the zoom lens group to the tele side. Upon completion of the operation to be performed in one of the aforementioned steps 1207, 1212 and 1209, control returns to the main routine in step 1213.

Next, processing to be performed by the lens microcomputer 115 of the third embodiment will be described.

FIG. 16 is a flowchart illustrating processing concerning a zooming operation, which is a part of the entire processing to be performed by the lens microcomputer 115. Incidentally, a manual zooming operation will be described hereunder by way of example. In step 1301, the processing is started. Then, in step 1302, the lens microcomputer 115 checks whether the zoom stop request signal comes thereto from the camera microcomputer 208. If the zoom stop request signal has already come thereto, control proceeds to step 1308. Otherwise, control advances to step 1303 whereupon the lens microcomputer 115 checks from the information sent from the camera microcomputer 208 which of the tele direction and the wide direction the moving direction of the zoom lens group is. If the tele direction, control proceeds to step 1304. Conversely, if the wide direction, control advances to step 1305.

In step 1304, the lens microcomputer 115 checks whether the zoom lens group is positioned at the tele end. If so, control proceeds to step 1308. Otherwise, control advances to step 1306. Further, the moving speed of the zoom lens group and the moving speed and direction of the focusing lens group are calculated in step 1306. According to a result of this calculation, the zoom lens group and the focusing lens group are driven in step 1307. Furthermore, in step 1308, the zoom lens group is stopped.

Upon completion of the operation performed in step 1307 or 1308, the lens microcomputer 115 checks in step 1309 whether the zoom lens group is placed at the tele end. If so, control proceeds to step 1310. Otherwise, control advances to step 1311. In step 1310, the lens microcomputer 115 sets information to be used for sending an electronic zooming permission signal to the camera microcomputer 208. Furthermore, in step 1311, the lens microcomputer 115 sets information to be used for sending an electronic zooming inhibition signal to the camera microcomputer 208. Then, control advances to step 1312.

In this step 1312, the lens microcomputer 115 checks whether the zoom lens group is moving to the wide side. If so, control proceeds to step 1313. Otherwise, control advances to step 1315. In step 1313, the lens microcomputer 115 checks whether a current focal length f of the zoom lens group is not less than a focal length fn at which the zoom lens group would reach the tele end within (1/60) seconds if the zoom lens group moved by maintaining a current zooming speed. If not less than fn, control proceeds to step 1314. Otherwise, control advances to step 1315. In step 1314, the lens microcomputer 115 sets information for sending an electronic zooming permission signal to the camera microcomputer 208. Furthermore, in step 1315, the lens microcomputer 115 sets information for sending an electronic zooming inhibition signal to the camera microcomputer 208. Upon completion of the operation to be performed in one of the aforementioned steps 1310, 1314 and 1315, control returns to the main routine in step 1316.

Next, the case of integrating the processing performed by the lens microcomputer 115 with the processing performed by the camera microcomputer 208 will be described.

Figure 18:
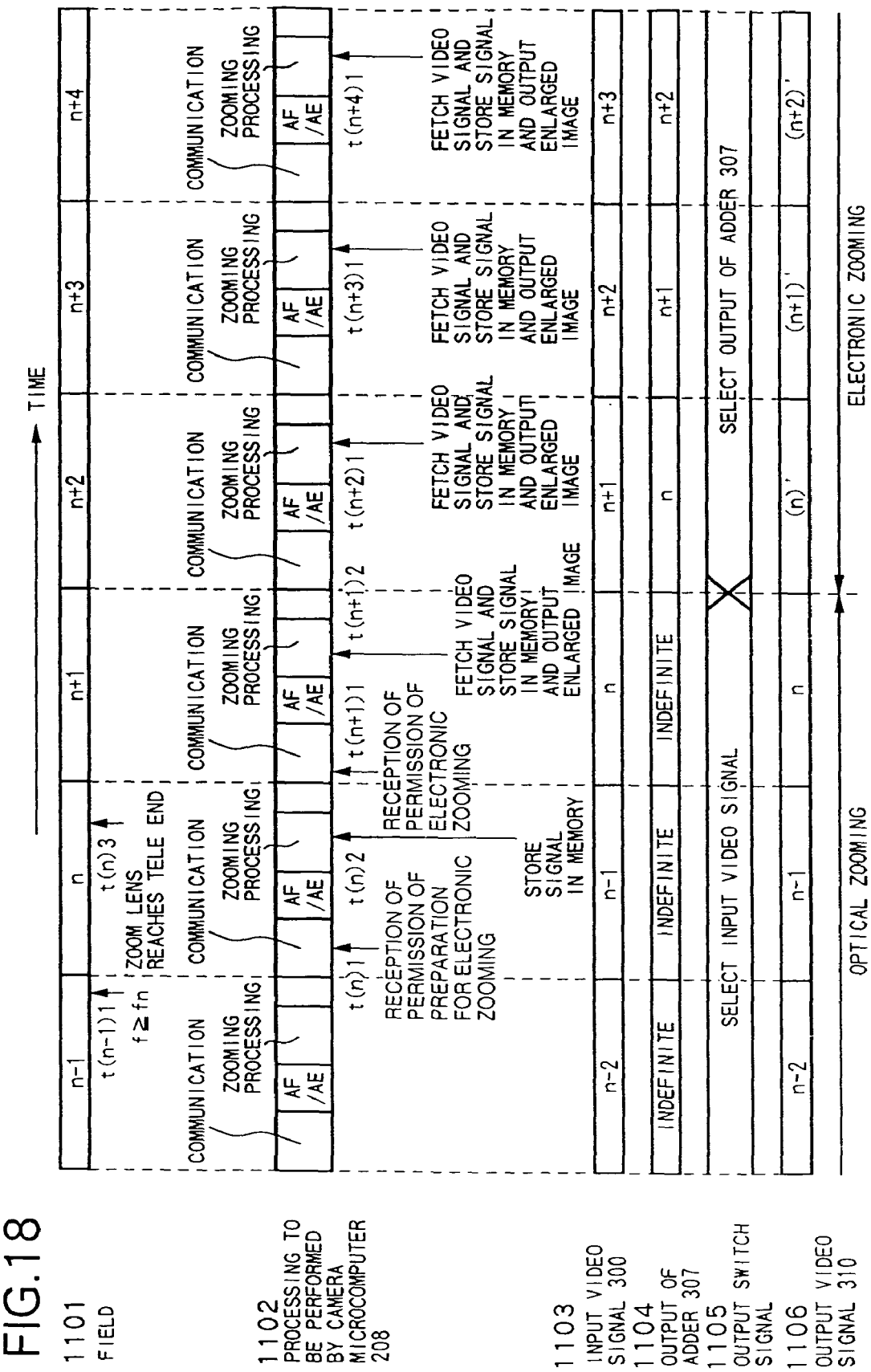
FIG. 18 is a diagram illustrating results of an actual zooming operation that is conducted according to processing performed by the lens and camera microcomputers of the third embodiment of the present invention.

FIG. 18 is a diagram illustrating the timing with which an output video signal is changed from video signals of an optical zooming region to those of an electronic zooming region when a zooming operation is performed from the wide side to the tele side. In this diagram, the transverse axis represents time. As viewed in this diagram, the righter the position of a time point on the transverse axis becomes, the later time the time point indicates. Reference numeral 1101 denotes a row representing a sequence of fields of a standard television signal. Fields (n−1) to (n+4) are shown in this figure. Reference numeral 1102 designates a row showing various kinds of processing to be performed by the camera microcomputer 208 in the respective fields. The aforementioned kinds of processing illustrated in FIG. 7 are performed in the respective fields.

Reference numeral 1103 designates a row showing the field Nos. of fields in which the input video signals 300 are obtained in the imager 201 by photoelectric conversion. Incidentally, a field, in which a video signal is read from the imager 201, is immediately subsequent to a field in which this video signal is obtained by photoelectric conversion. Thus, the field No. of this field is smaller than the field No. thereof shown in the row 1101 by 1. Reference numeral 1104 designates a row showing the field No. of a field in which an output signal of the adder 307 is obtained in the imager 201 by photoelectric conversion. However, an output signal of the adder 307 is indefinite until a video signal is fetched in the memory circuit 301. After a video signal is fetched thereto, a signal delayed by 1 field is outputted from the adder 307.

Reference numeral 1105 denotes a row indicating which of the input video signal 300 and the output signal of the adder 307 is selected by the output switch circuit 309 according to a switch signal outputted from the microcomputer interface circuit 304. Reference numeral 1106 designates a row indicating the field No. of a field in which the output video signal 310 is obtained in the imager 201 by photoelectric conversion.

Next, a process flow of the zooming processing will be described by concentrating on the processing to be performed by the camera microcomputer 208.

In the zooming operation from the wide side to the tele side, the lens microcomputer 115 detects at the time t(n−1)1 that the current focal length f of the zoom lens group is not less than the focal length fn at which the zoom lens group would reach the tele end within (1/60) seconds if the zoom lens group moved by maintaining the current zooming speed. Then, the lens microcomputer 115 prepares electronic zooming permission information for the next communication with the camera microcomputer 208 in the field n if the optical zoom lens reaches the optical tele end at the time t(n)1.

In the field "n", an electronic zooming enabling signal is sent from the lens microcomputer 115 to the camera microcomputer 208 by the communication performed at the time t(n)1. In the zooming processing at the time t(n)2, the camera microcomputer 208 performs an operation for causing the memory circuit 301 to store the input video signal 300 in the time (n+1). In the field (n+1), an operation for causing the input video signal 300 obtained in the field (n+3) to be stored in the memory circuit 301 is performed. Moreover, if the optical zoom lens group reaches the optical tele end at the time t(n)3, the lens microcomputer 115 prepares electronic zooming permission information for the next communication with the camera microcomputer 208.

In the field "n", an electronic zooming preparation permission signal is sent from the lens microcomputer 115 to the camera microcomputer 208 by the communication performed at the time t(n+1)1. In the zooming processing at the time t(n+1)2, the camera microcomputer 208 performs an operation for causing the memory circuit 301 to store the input video signal 300 in the time (n+1), and also performs operations of enlarging an image, which is represented by the stored input video signal 300 in the field (n+2), and of outputting a video signal (n+1)' representing an enlarged image to the output switch circuit 309, and of selecting a received output of the adder 307 as an output of the output switch circuit 309.

In the field (n+2), an operation of storing the input video signal 300, which is obtained in the field (n+3), in the memory circuit 301 is performed during the zooming processing at the time t(n+2)1. Further, the circuit performs operations of enlarging an image, which is represented by the stored input video signal 300 in the field (n+2), in the field (n+3), and of outputting a video signal (n+1)' representing an enlarged image, and of selecting a received output of the adder 307 as an output of the output switch circuit 309. Further, the circuit performs operations of enlarging an image, which is represented by the stored input video signal 300 in the field (n+3), in the field (n+4), and of outputting a video signal (n+1)' to the output switch circuit 309. In the field (n+3) and the subsequent fields, the same processing as performed in the field (n+2) is carried out.

Next, change 1106 in the output video signal 310 with time will be described. Because the zoom lens reaches the optical tele end in the field "n", signals obtained in the imager 201 by photoelectric conversion in the fields up to (n−1) and signals obtained by photoelectric conversion in the field "n", in which the optical zooming is ceased in the middle thereof, are video signals obtained during the optical zooming. Thus, the output video signals outputted in the fields up to (n+1) are signals outputted during the optical zooming. Each of the output video signals 310 outputted in the field (n+2) and the subsequent fields are obtained by enlarging the signal stored in the memory circuit 301 in the immediately precedent field and are video signals obtained during the electronic zooming.

Incidentally, in the aforementioned third embodiment, the lens microcomputer 115 is adapted to detect that the current focal length f of the zoom lens group is not less than the focal length fn at which the zoom lens group would reach the tele end within (1/60) seconds if the zoom lens group moved by maintaining the current zooming speed. Further, the lens microcomputer 115 is adapted to prepare electronic zooming permission information for the next communication with the camera microcomputer 208. However, even in the case that a large time delay is caused in the timing of obtaining electronic zooming permission information from the lens microcomputer 115 by the camera microcomputer 208 for some reason after the zoom lens group reaches the optical tele end, smooth switching between optical and electronic zooming operations is realized by setting fn, which meets the aforementioned inequality $f \leq fn$ where f is the focal length of the zoom lens group, in such a manner that the zoom lens group would reach the optical tele end within a time period, which is an integral multiple of the cycle of the communication between the lens microcomputer 115 and the camera microcomputer 208 corresponding to the aforementioned time delay, if the zoom lens group moved by maintaining the current zooming speed.

As described above, according to the third embodiment, an electronic zooming preparation permission signal and an electronic zooming enabling signal are outputted to the camera body unit during the zooming operation. Thus, even in the case that there is a delay in performing electronic zooming, a zooming operation is smoothly performed without suspension.

Further, according to the third embodiment, electronic zooming is enabled when the aforementioned signals are inputted from the lens unit. Consequently, even in the case that a delay occurs in performing electronic zooming, a zooming operation is smoothly performed without suspension.

Fourth Embodiment

In the case that the interchangeable lens unit 100 as an electrically-controllable optical zooming mechanism, similarly as in the case of the first to third embodiment, optical zooming and electronic zooming are achieved under the control of the camera microcomputer 208. However, in the case that, as shown in FIGS. 16 and 17, the lens units 130 and 140 have no electrically-controllable optical zooming mechanisms, the control of electronic zooming is not taken into consideration.

This fourth embodiment is enabled to smoothly function an electronic zooming mechanism of the camera body unit according to the type of an external lens unit (for instance, an interchangeable lens unit), regardless of the presence/absence of an electrically controllable optical zooming mechanism in the external lens unit.

Hereinafter, the fourth embodiment will be described.

Video camera of the fourth embodiment has a camera body unit whose hardware configuration is the same as that of the body unit 200 shown in FIG. 4. This camera body unit 200 is combined with an interchangeable lens unit that has the same hardware configuration as that of the interchangeable lens unit shown in FIG. 19, 20 or 4. Incidentally, the fourth embodiment is different in software used in the camera microcomputer 208 and the lens microcomputer 115 from the conventional video camera. Hereinafter, only the differences therebetween will be described.

Figure 21:
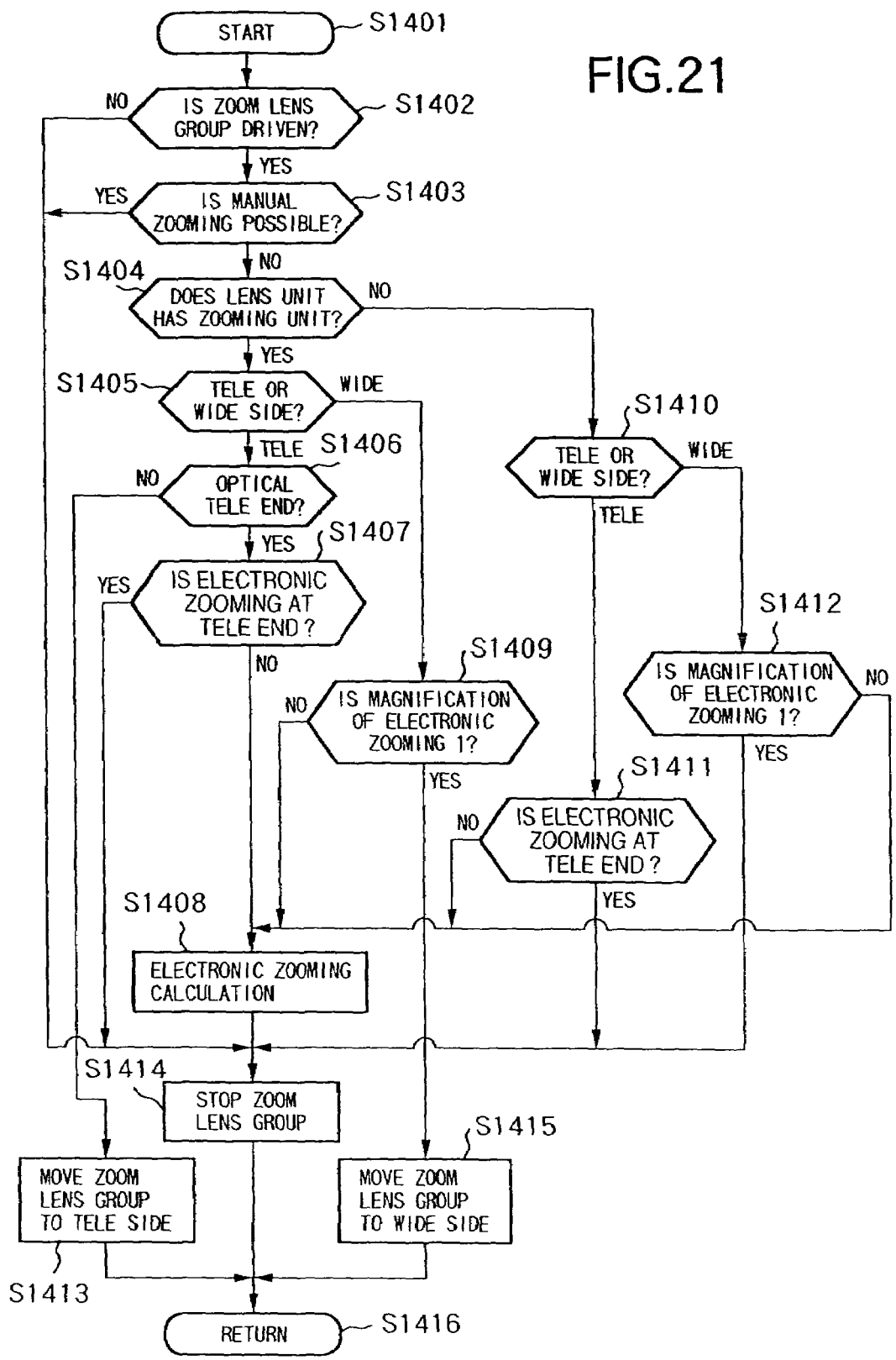
FIG. 21 is a flowchart detailedly illustrating zooming processing to be performed by a camera microcomputer of a fourth embodiment of the present invention.

The flow of the processing to be performed by the camera microcomputer 208 is broadly similar to the flow illustrated in FIGS. 7 and 8. FIG. 21 shows a process flow of step 406 of this embodiment, which is illustrated in FIG. 7.

In step S1401, the processing is started. Then, in step S1402, the camera microcomputer 208 checks whether the zoom keys 210 and 211 of the camera body unit 200 are not operated or whether each of these zoom keys is operated in the tele or wide direction. If the zoom keys are operated, control advances to step S1403. If not operated, control proceeds to step S1414. In step S1403, the camera microcomputer 208 checks manual zooming capability information sent from the lens microcomputer 115. If manual zooming is possible, control advances to step S1414. Otherwise, control proceeds to step S1404 whereupon the camera microcomputer 208 checks presence-of-zooming-unit information sent from the lens microcomputer of the interchangeable lens unit. If the lens unit has a zooming unit, control advances to step S1405. Otherwise, control unit proceeds to step S1410. In step S1405, the camera microcomputer 208 checks whether the zoom keys 210 and 211 of the camera body unit 200 are operated in a direction corresponding to the tele side. If the zoom keys are operated in a direction corresponding to the tele side, control advances to step S1406. If the zoom keys are operated in a direction corresponding to the wide side, control proceeds to step S1409. In step S1406, the camera microcomputer 208 checks optical tele end information sent from the lens microcomputer of the interchangeable lens unit. If this information indicates the optical tele end, control advances to step S1407. Otherwise, control proceeds to step S1413. In step S1407, the camera microcomputer 208 checks whether the zooming unit is at the tele end in the case of electronic zooming. If so, control advances to step S1414. Otherwise, control proceeds to step S1408. In step S1414, the camera microcomputer 208 checks whether an electronic zooming operation is currently being performed. If so, control advances to step S1408. Otherwise, control proceeds to step S1415. In step S1408, an electronic zooming operation is performed by increasing or decreasing the aforementioned interpolation coefficients according to which of the switches 210 and 211 is pushed. Moreover, the camera microcomputer 208 controls the enlargement processing circuit 205 according to a result of the electronic zooming operation. Then, control advances to step S1414.

On the other hand, in step S1410, the camera microcomputer 208 checks whether each of the zoom keys 210 and 211 of the camera body unit 200 is operated in a direction corresponding to the tele or wide direction. If operated in the direction corresponding to the tele side, control proceeds to, step S1411. Conversely, if operated in the direction corresponding to the wide side, control advances to step S1412. In step S1411, the camera microcomputer 208 checks whether the zooming unit is at the tele end in the case of electronic zooming. If so, control advances to step S1414. Otherwise, control proceeds to step S1408. In step S1412, the camera microcomputer 208 checks whether an electronic zooming operation is currently being performed. If so, control advances to step S1408. Otherwise, control proceeds to step S1414.

In step S1413, the camera microcomputer 208 sets a control signal for moving the zoom lens to the tele side. In step S1414, the camera microcomputer 208 sets a control signal for stopping the zoom lens. In step S1415, the camera microcomputer 208 sets a control signal for moving the zoom lens to the wide side.

Upon completion of the operation performed in one of the aforementioned steps S1413, S1414 and S1415, control returns to an upper-level routine in step S1416.

Next, the video camera having the combination of the camera body unit 200 of the hardware configuration shown in FIG. 4 and the interchangeable lens unit 130 of the hardware configuration shown in FIG. 19 will be first described below.

Figure 19:
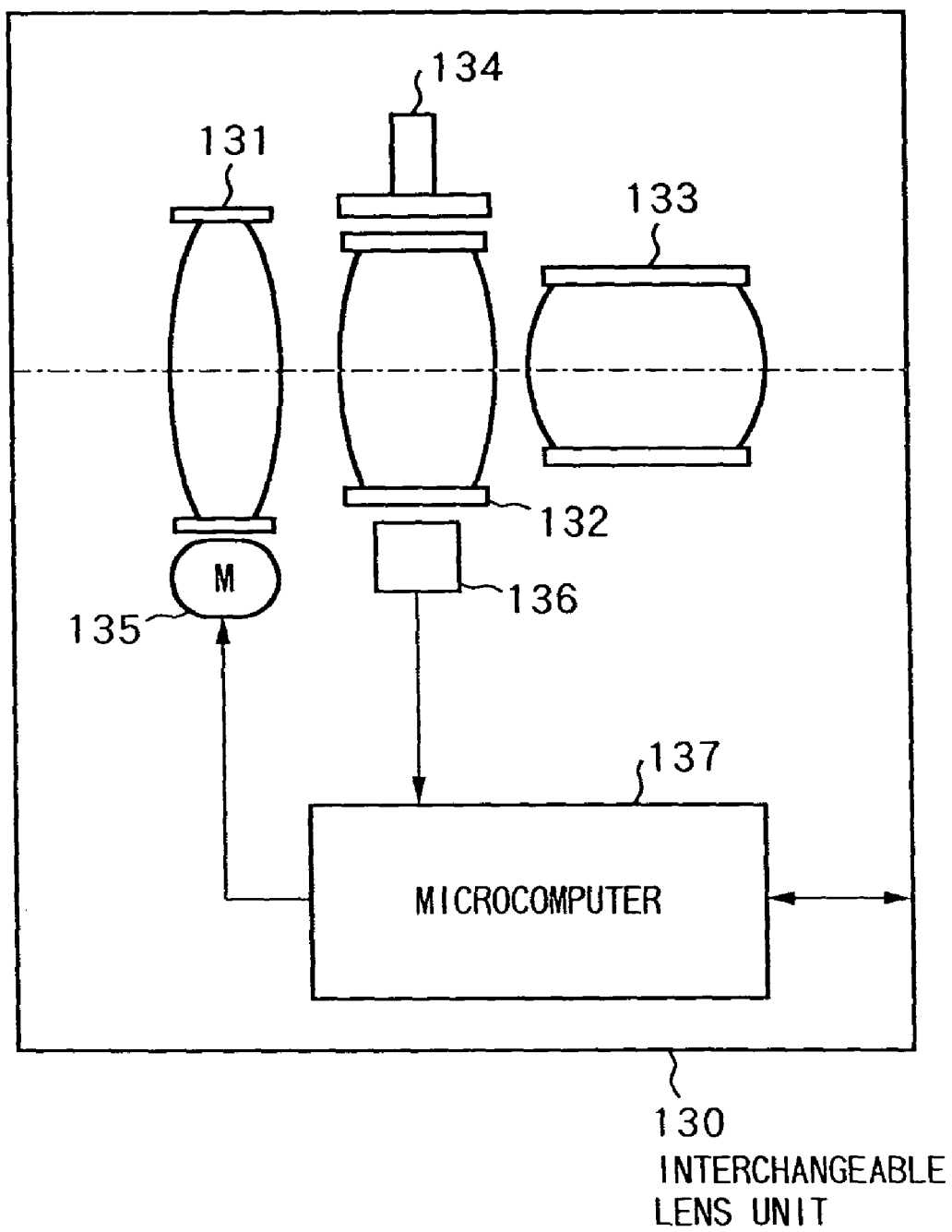
FIG. 19 is a diagram showing the configuration of an interchangeable lens unit.

As shown in FIG. 19, reference numeral 130 designates an interchangeable lens unit detachably attached to a camera body unit 200. In the interchangeable lens unit 130, reference numeral 131 denotes a focusing lens group for performing a focusing function; and 132 a variator lens group for changing a magnification, which consists of a variator lens and a compensator lens and changes the position thereof in accordance with a cam (not shown) to thereby vary the focal length thereof. Reference numeral 133 designates a fixed image-forming lens group. These lens groups 131 to 133 constitute a lens system of what is called a front lens focusing type.

Reference numeral 134 denotes a zoom ring for manually moving the variator lens group 132 by a cameraman. A zooming operation is enabled only by using this zoom ring 134 (an optical zooming mechanism which does not operate according to a control signal inputted from an external device). Reference numeral 135 designates a stepping motor for moving the focusing lens group 131; 136 a zoom encoder; 137 a lens microcomputer which is operative to communicate with the microcomputer 208 of the camera body unit 200 and to control the stepping motor 135.

Figure 22:
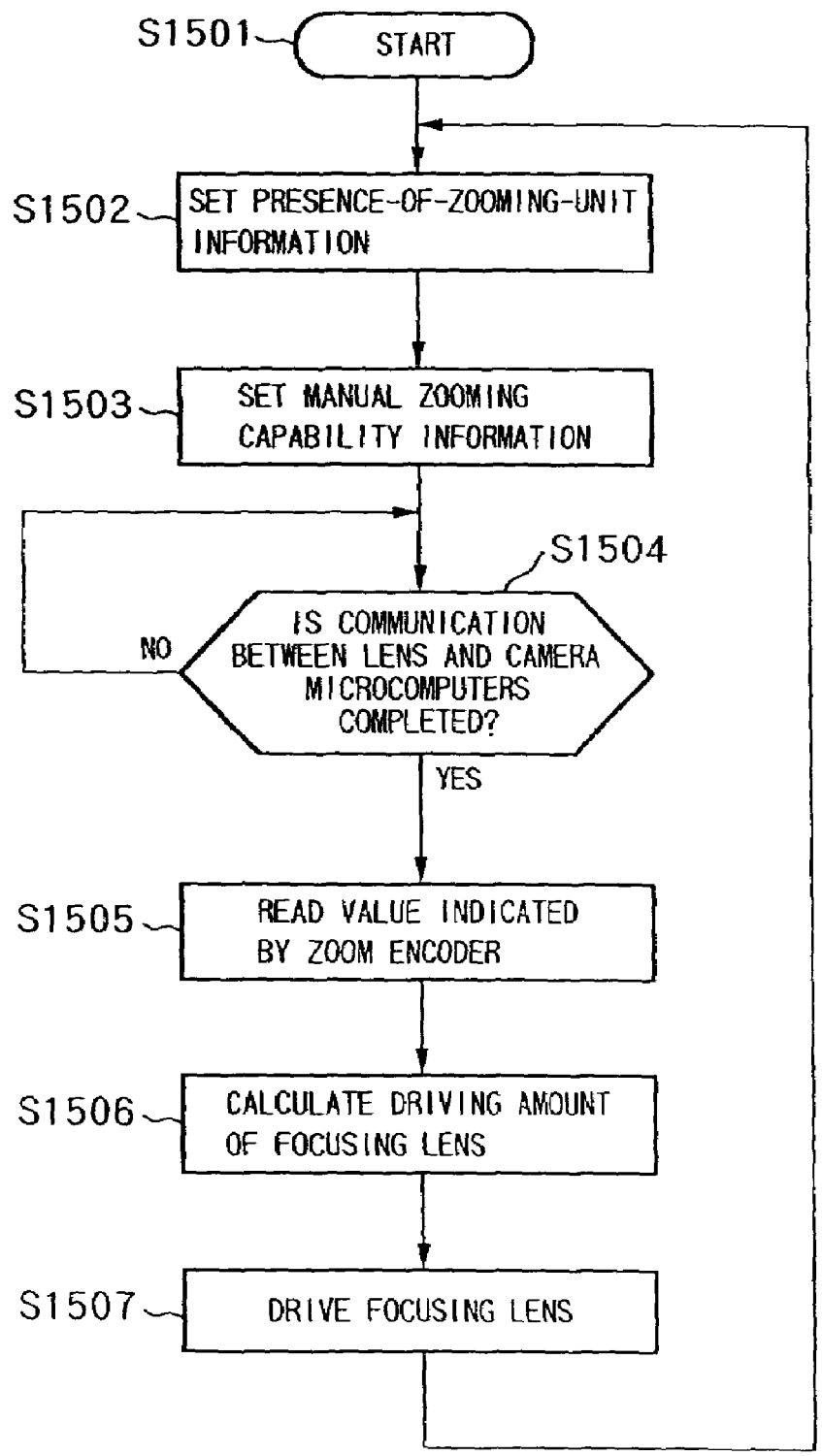
FIG. 22 is a flowchart illustrating zooming processing to be performed by a camera microcomputer of the interchangeable lens unit of FIG. 19 in the fourth embodiment of the present invention.

FIG. 22 is a flowchart illustrating a part of processing to be performed by the lens microcomputer 137.

In step S1501, the processing is started. Then, in step S1502, the lens microcomputer 137 sets presence-of-zooming-unit information and makes preparations for sending this information to the camera microcomputer 208. Then, control advances to step S1503 whereupon the lens microcomputer 137 sets manual zooming capability information and makes preparations for sending this information to the camera microcomputer 208. Subsequently, control proceeds to step S1504 whereupon it is judged by interruption processing whether the communication between the lens microcomputer 137 and the camera microcomputer 208 is completed. If completed, control advances to step S1505. Otherwise, control goes back to step S1504. In step S1505, the lens microcomputer 137 reads a value indicated by the zoom encoder 136. Then, control proceeds to step S1506 whereupon a driving amount of the focusing lens is calculated from the value indicated by the zoom encoder 136 and from an autofocusing estimation value provided by the camera body unit 200 (incidentally, the detailed description of this value is omitted for simplicity of description). Subsequently, control advances to step S1507 whereupon the stepping motor for moving the focusing lens 131 is driven according to the driving amount of the focusing lens calculated in step S1506. Thereafter, control goes back to step S1502.

As is understood from the foregoing description, in the case of the combination of the camera body unit 200 and the interchangeable lens unit 130, the manual zooming capability information (indicating the presence of the optical zooming mechanism which does not operate according to control information provided from an external device) is set (in step S1503) by the lens microcomputer 137. Thus, the camera microcomputer 208 judges (in step S1403) that a manual zooming operation can be performed. Consequently, an electronic zooming mechanism (the enlargement processing circuit 205) provided in the camera body unit 200 does not function.

Next, the video camera having the combination of the camera body unit 200 of the hardware configuration shown in FIG. 4 and the interchangeable lens unit 140 of the hardware configuration shown in FIG. 20 will be described below.

Figure 20:
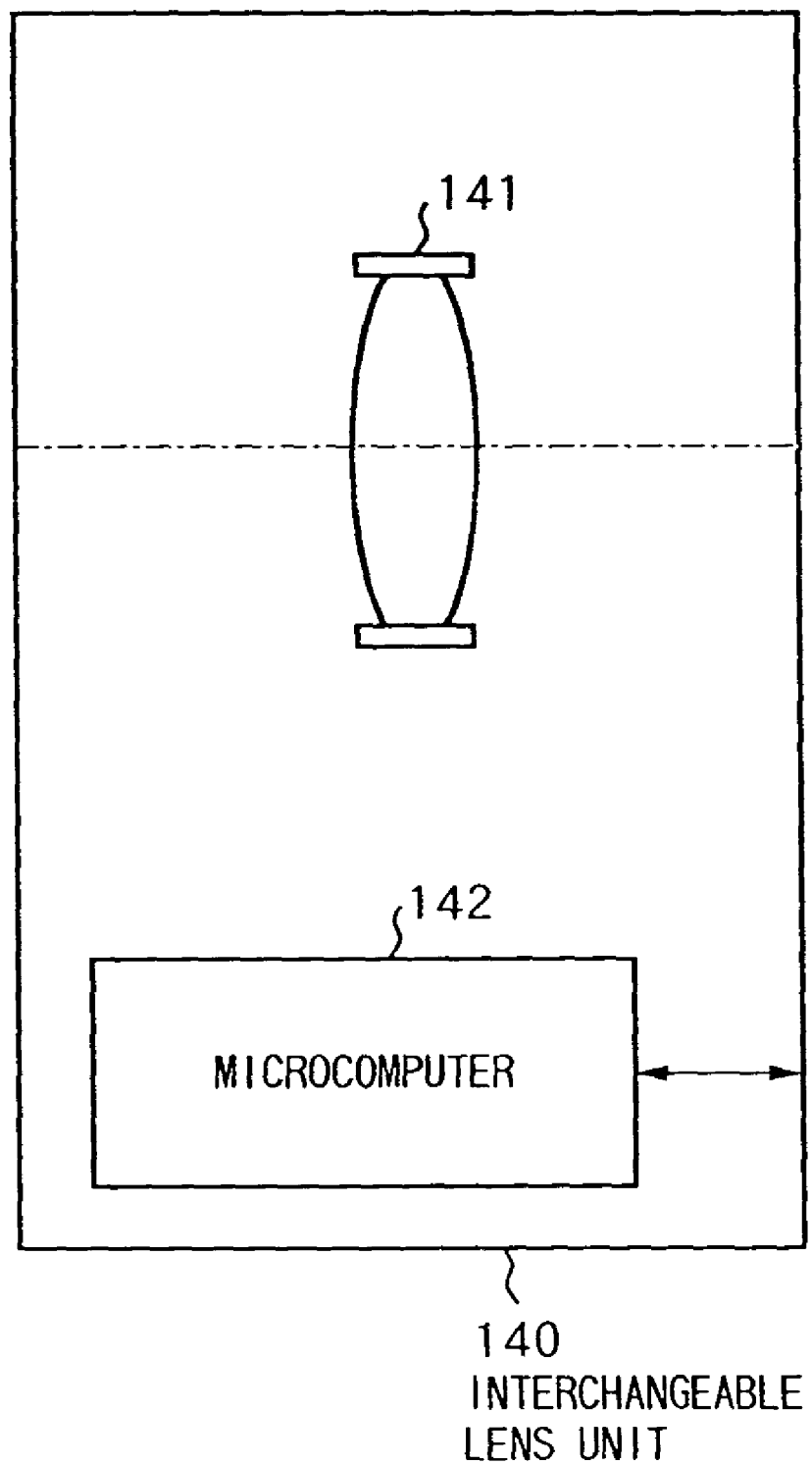
FIG. 20 is a diagram showing the configuration of another interchangeable lens unit.

As shown in FIG. 20, reference numeral 140 designates an interchangeable lens unit detachably attached to a camera body unit 200. In the interchangeable lens unit 140, reference numeral 141 denotes a focusing lens group constituting a short focus lens; and 142 a lens microcomputer which is operative to communicate with the microcomputer 208 of the camera body unit 200.

Figure 23:
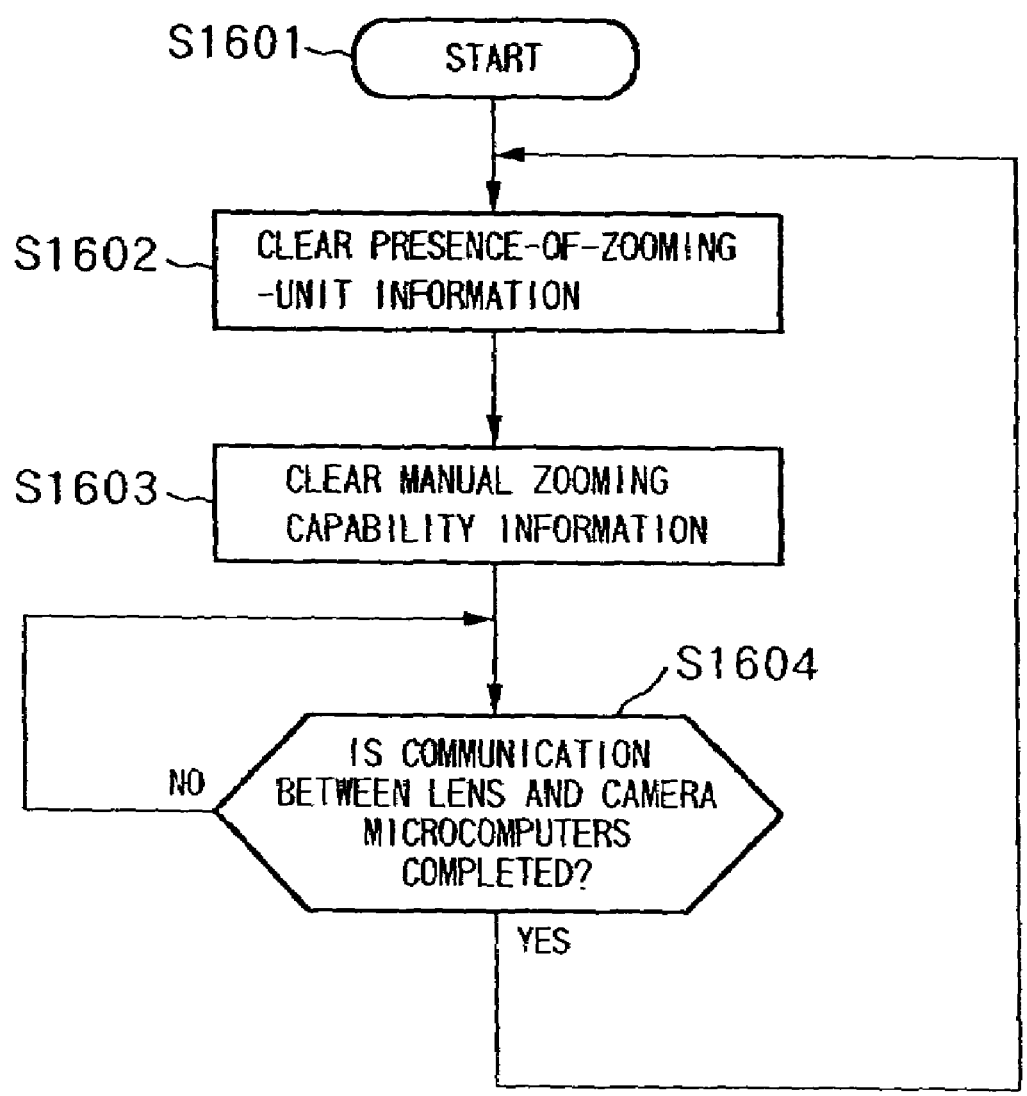
FIG. 23 is a flowchart illustrating zooming processing to be performed by a camera microcomputer of the interchangeable lens unit of FIG. 20 in the fourth embodiment of the present invention.

FIG. 23 is a flowchart illustrating a part of processing to be performed by the lens microcomputer 142.

In step S1601, the processing is started. Then, in step S1602, the lens microcomputer 142 clears presence-of-zooming-unit information and makes preparations for sending absence-of-zooming-unit information to the camera microcomputer 208. Then, control advances to step S1603 whereupon the lens microcomputer 142 sets manual zooming capability information and makes preparations for sending information, which indicates that manual zooming cannot be performed, to the camera microcomputer 208. Subsequently, control proceeds to step S1604 whereupon it is judged by interruption processing whether the communication between the lens microcomputer 142 and the camera microcomputer 208 is completed. If completed, control goes back to step S1602. Otherwise, control goes back to step S1604.

As is understood from the foregoing description, in the case of the combination of the camera body unit 200 and the interchangeable lens unit 140, the manual zooming capability information (indicating the presence of the optical zooming mechanism) is cleared (in step S1602) by the lens microcomputer 142. Further, the manual zooming capability information is cleared (in step S1603). Thus, the camera microcomputer 208 judges (in steps S1403 and S1404) that a manual zooming operation cannot be performed and no zooming unit is provided in the camera. Consequently, an electronic zooming mechanism (the enlargement processing circuit 205) provided in the camera body unit 200 functions.

Next, the video camera having the combination of the camera body unit 200 of the hardware configuration and the interchangeable lens unit 100 of the hardware configuration, which are shown in FIG. 4, will be described below.

Figure 24:
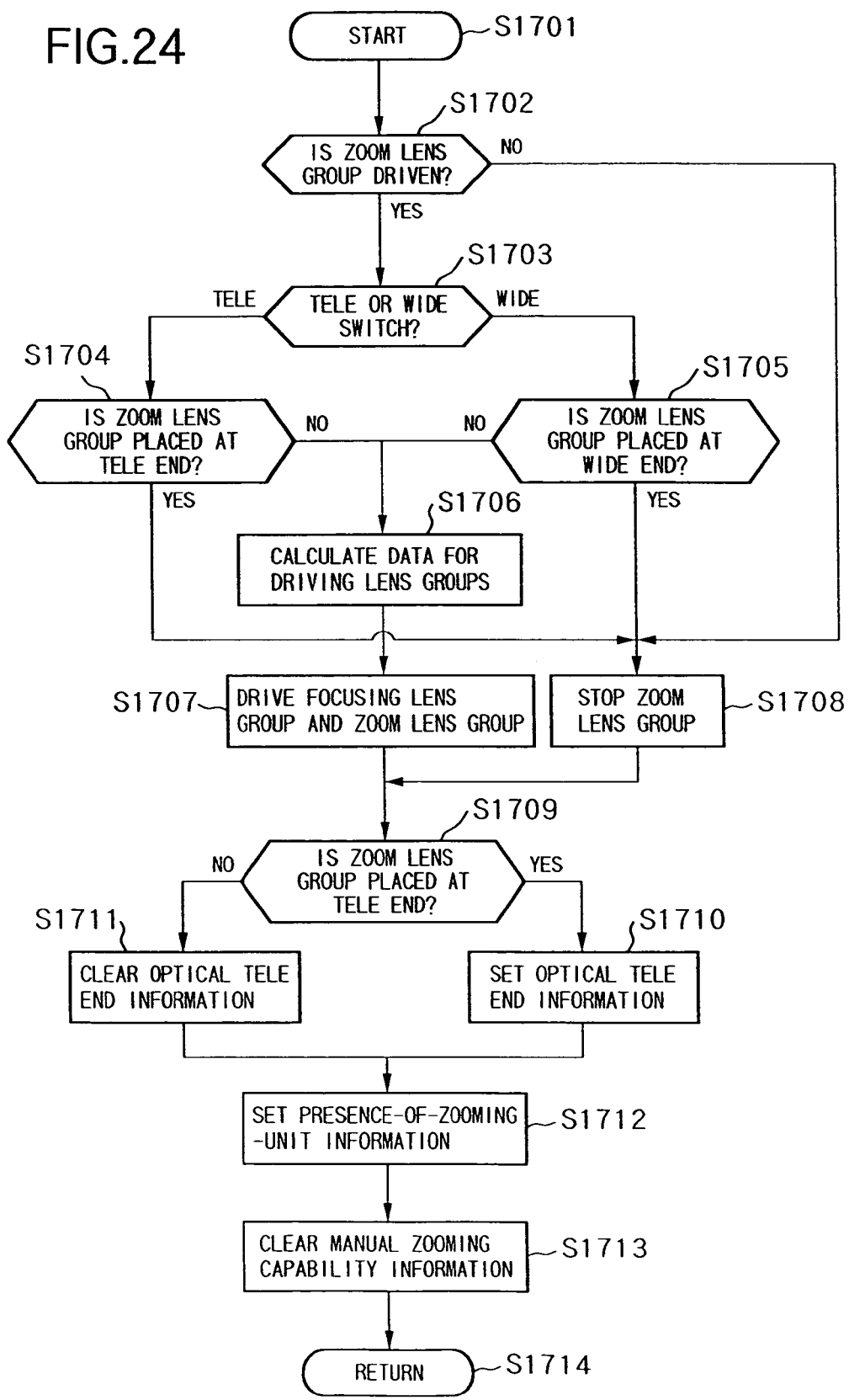
FIG. 24 is a flowchart illustrating zooming processing to be performed by a camera microcomputer of the interchangeable lens unit of FIG. 4 in the fourth embodiment of the present invention.

FIG. 24 is a flowchart illustrating processing concerning a zooming operation, which is a part of the entire processing to be performed by the lens microcomputer 115. In step S1701, the processing is started. Then, in step S1702, the lens microcomputer 115 checks whether a zoom lens stop request signal (S1414) comes thereto from a camera microcomputer 208. If the zoom lens group has already stopped, control proceeds to step S1708. Otherwise, control advances to step S1703 whereupon the lens microcomputer 115 checks according to the information sent by the camera microcomputer 208 which of the tele direction and the wide direction the moving direction of the zoom lens group is. If the moving direction of the zoom lens group is the tele direction, control proceeds to step S1704. If the wide direction, control advances to step S1705.

In step S1704, the lens microcomputer 115 checks whether the zoom lens group is positioned at the tele end. If so, control proceeds to step S1708. Otherwise, control advances to step S1706. Further, in step S1705, the lens microcomputer 115 checks whether the zoom lens group is positioned at the wide end. If so, control proceeds to step S1708. Otherwise, control advances to step S1706. The moving speed of the zoom lens group and the moving speed and direction of the focusing lens group are calculated in step S1706. According to a result of this calculation, the zoom lens group and the focusing lens group are driven in step S1707. Furthermore, in step S1708, the zoom lens group is stopped.

Upon completion of the operation performed in step S1707 or S1708, the lens microcomputer 115 checks in step S1709 whether the zoom lens group is placed at the tele end. If so, control proceeds to step S1710. Otherwise, control advances to step S1711. In step S1710, the lens microcomputer 115 sets optical tele end information and makes preparations for sending this information to the camera microcomputer 208. Further, in step S1711, the lens microcomputer 115 clears optical tele end information and makes preparations for sending information, which indicates that the zoom lens group is not placed at the tele end, to the camera microcomputer 208. In step S1712, the lens microcomputer 115 sets presence-of-zooming-unit information and makes preparations for sending this information to the camera microcomputer 208. Then, control proceeds to step S1713 whereupon the lens microcomputer 115 clears manual zooming capability information and makes preparations for sending information, which indicates that manual zooming cannot be performed, to the camera microcomputer 208. Subsequently, control advances to step S1714. Further, control returns to a main routine in step S1714.

As is understood from the foregoing description, in the case of the combination of the camera body unit 200 and the interchangeable lens unit 100, the presence-of-zooming-unit information is set (in step S1712) by the lens microcomputer 115. Further, the manual zooming capability information is cleared (in step S1713). Thus, the camera microcomputer 208 judges (in steps S1403 and S1404) that a manual zooming operation cannot be performed and a zooming unit is provided in the camera. Consequently, an electronic zooming mechanism provided in the camera body unit 200 functions.

Fifth Embodiment

A video camera of the fifth embodiment has a camera body unit of the same hardware configuration as the configuration of the unit 200 illustrated in FIG. 4, similarly as the fourth embodiment does. In the case of the fifth embodiment, such a camera body unit is combined with an interchangeable lens unit of the same hardware configuration as the configuration of the interchangeable lens unit shown in FIG. 19, 20 or 4. Incidentally, the fifth embodiment is different in software used in the camera microcomputer 208 and the lens microcomputer 115 from the conventional video camera and the fourth embodiment. Hereunder, only the differences therebetween will be described.

Figure 25:
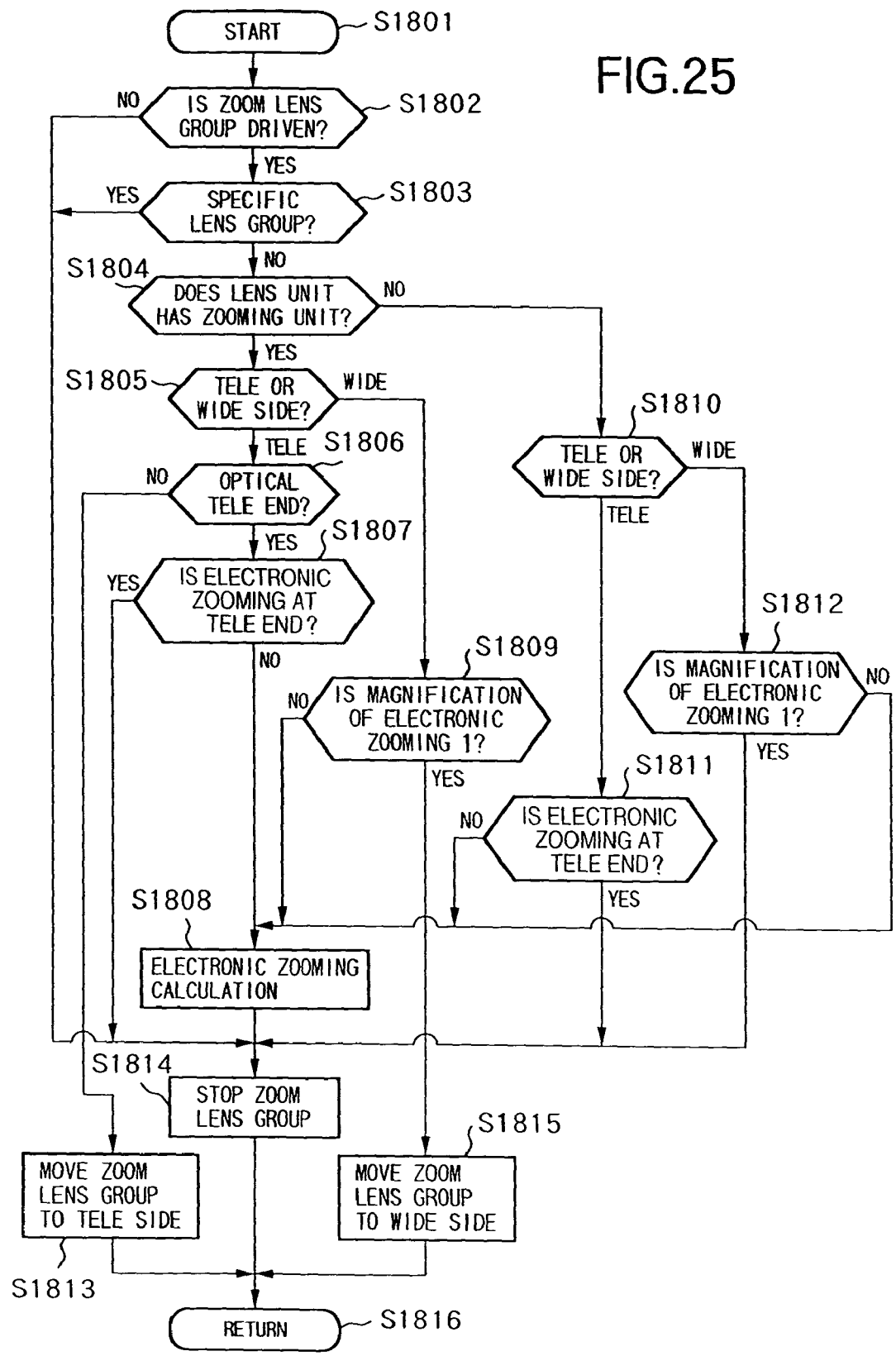
FIG. 25 is a flowchart detailedly illustrating zooming processing to be performed by a camera microcomputer of a fifth embodiment of the present invention.

The flow of the processing to be performed by the camera microcomputer 208 of this embodiment is broadly similar to the flow illustrated in FIGS. 7 and 8. FIG. 25 shows a process flow of step 406 of this embodiment, which is illustrated in FIG. 7.

In step S1801, the processing is started. Then, in step S1802, the camera microcomputer 208 checks whether the zoom keys 210 and 211 of the camera body unit 200 are not operated or whether each of these zoom keys is operated in the tele or wide direction. If the zoom keys are operated, control advances to step S1803. If not operated, control proceeds to step S1814. In step S1803, the camera microcomputer 208 checks specific lens group information sent from the lens microcomputer of the interchangeable lens unit. If the interchangeable lens unit belongs to the specific lens group, control advances to step S1414. Otherwise, control proceeds to step S1804 whereupon the camera microcomputer 208 checks presence-of-zooming-unit information sent from the lens microcomputer of the interchangeable lens unit. If the lens unit has a zooming unit, control advances to step S1805. Otherwise, control unit proceeds to step S1810. In step S1805, the camera microcomputer 208 checks whether the zoom keys 210 and 211 of the camera body unit 200 are operated in a direction corresponding to the tele side. If the zoom keys are operated in a direction corresponding to the tele side, control advances to step S1806. If the zoom keys are operated in a direction corresponding to the wide side, control proceeds to step S1809. In step S1806, the camera microcomputer 208 checks optical tele end information sent from the lens microcomputer of the interchangeable lens unit. If this information indicates the optical tele end, control advances to step S1807. Otherwise, control proceeds to step S1813. In step S1807, the camera microcomputer 208 checks whether the zooming unit is at the tele end in the case of electronic zooming. If so, control advances to step S1814. Otherwise, control proceeds to step S1808. In step S1809, the camera microcomputer 208 checks whether an electronic zooming operation is currently being performed. If so, control advances to step S1808. Otherwise, control proceeds to step S1815. In step S1808, an electronic zooming operation is performed by increasing or decreasing the aforementioned interpolation coefficients according to which of the switches 210 and 211 is pushed. Moreover, the camera microcomputer 208 controls the enlargement processing circuit 205 according to a result of the electronic zooming operation. Then, control advances to step S1814.

On the other hand, in step S1810, the camera microcomputer 208 checks whether each of the zoom keys 210 and 211 of the camera body unit 200 is operated in a direction corresponding to the tele or wide direction. If operated in the direction corresponding to the tele side, control proceeds to step S1811. Conversely, if operated in the direction corresponding to the wide side, control advances to step S1812. In step S1811, the camera microcomputer 208 checks whether the zooming unit is at the tele end in the case of electronic zooming. If so, control advances to step S1814. Otherwise, control proceeds to step S1808. In step S1812, the camera microcomputer 208 checks whether an electronic zooming operation is currently being performed. If so, control advances to step S1808. Otherwise, control proceeds to step S1814.

In step S1813, the camera microcomputer 208 sets a control signal for moving the zoom lens group to the tele side. In step S1814, the camera microcomputer 208 sets a control signal for stopping the zoom lens. In step S1815, the camera microcomputer 208 sets a control signal for moving the zoom lens to the wide side.

Upon completion of the operation performed in one of the aforementioned steps S1813, S1814 and S1815, control returns to an upper-level routine in step S1816.

Next, the video camera having the combination of the camera body unit 200 of the hardware configuration shown in FIG. 4 and the interchangeable lens unit 130 of the hardware configuration shown in FIG. 19 will be first described below. It is assumed that the interchangeable lens unit 130 has a manual zooming mechanism which cannot be controlled by using a control signal inputted from an external device, and that the lens unit 130 belongs to the "specific lens group".

Figure 26:
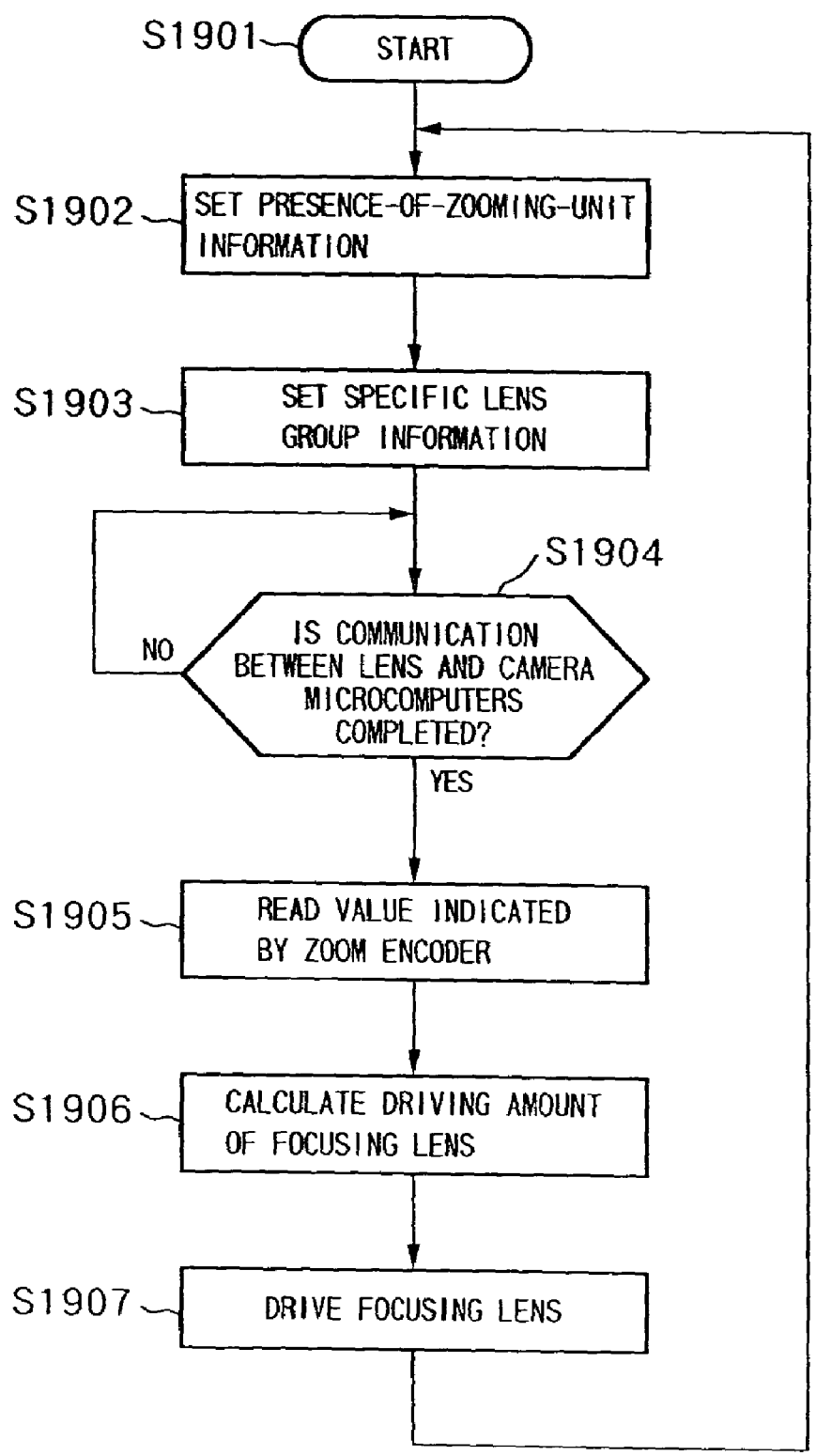
FIG. 26 is a flowchart illustrating zooming processing to be performed by the camera microcomputer of the interchangeable lens unit of FIG. 19 in the fifth embodiment of the present invention.

FIG. 26 is a flowchart illustrating a part of processing to be performed by the lens microcomputer 137.

In step S1901, the processing is started. Then, in step S1902, the lens microcomputer 137 sets presence-of-zooming-unit information and makes preparations for sending this information to the camera microcomputer 208. Then, control advances to step S1903 whereupon the lens microcomputer 137 sets specific lens group information and makes preparations for sending this information to the camera microcomputer 208. Subsequently, control proceeds to step S1904 whereupon it is judged by interruption processing whether the communication between the lens microcomputer 137 and the camera microcomputer 208 is completed. If completed, control advances to step S1905. Otherwise, control goes back to step S1904. In step S1905, the lens microcomputer 137 reads a value indicated by the zoom encoder 136. Then, control proceeds to step S1906 whereupon a driving amount of the focusing lens is calculated from the value indicated by the zoom encoder 136 and from an autofocusing estimation value provided by the camera body unit 200 (incidentally, the detailed description of this value is omitted for simplicity of description). Subsequently, control advances to step S1907 whereupon the stepping motor for moving the focusing lens 131 is driven according to the driving amount of the focusing lens calculated in step S1906. Thereafter, control goes back to step S1902.

As is understood from the foregoing description, in the case of the combination of the camera body unit 200 and the interchangeable lens unit 130, the specific lens group information (indicating that the lens unit has an optical zooming mechanism which does not operate according to control information provided from an external device) is set (in step S1903) by the lens microcomputer 137. Thus, the camera microcomputer 208 judges (in step S1903) that the lens unit is a specific lens group. Consequently, an electronic zooming mechanism (the enlargement processing circuit 205) provided in the camera body unit 200 does not function.

Next, the video camera having the combination of the camera body unit 200 of the hardware configuration shown in FIG. 4 and the interchangeable lens unit 140 of the hardware configuration shown in FIG. 20 will be described below. Incidentally, it is assumed that the interchangeable lens unit 140 does not have a zooming mechanism and thus does not belong to the "specific lens group".

Figure 27:
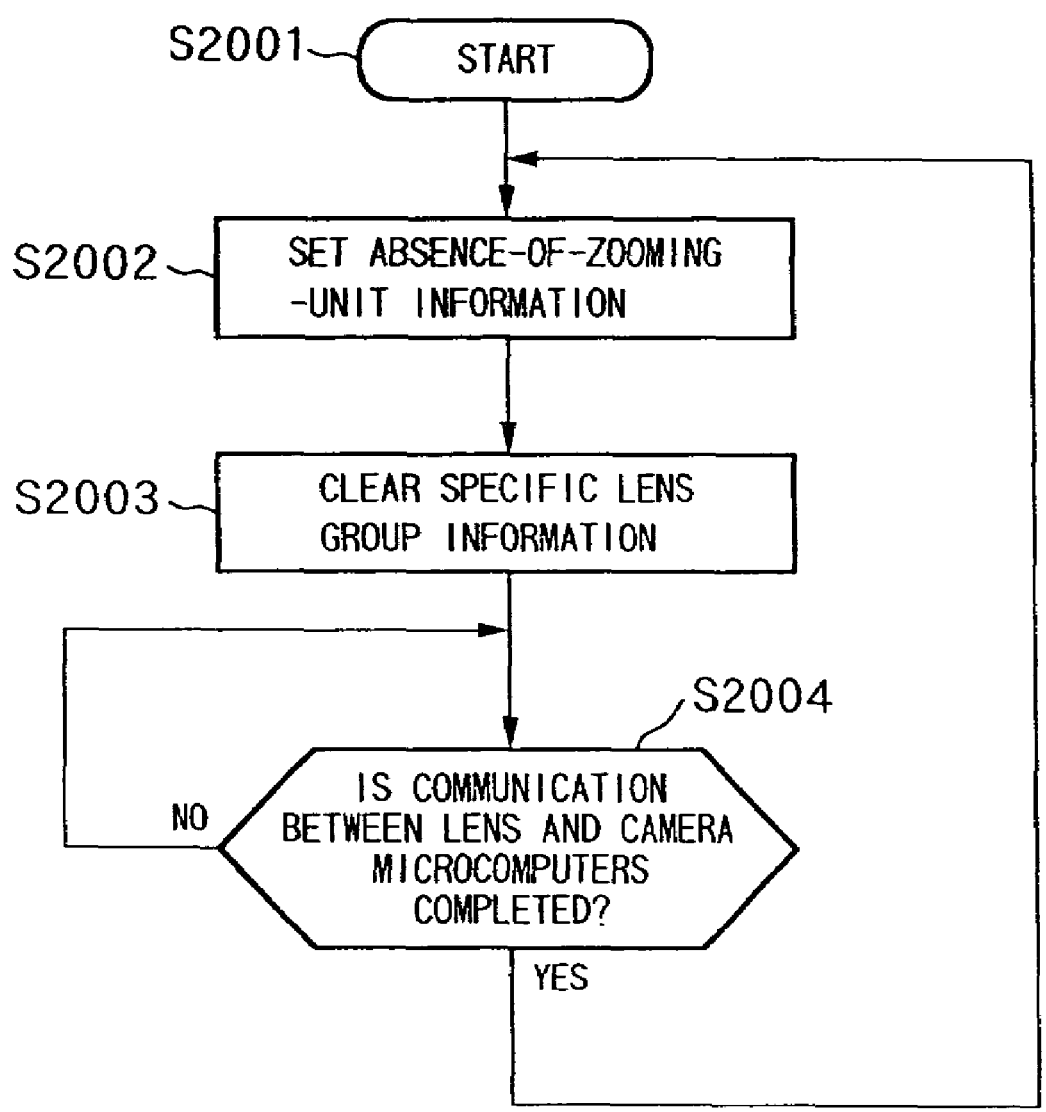
FIG. 27 is a flowchart illustrating zooming processing to be performed by the camera microcomputer of the interchangeable lens unit of FIG. 20 in the fifth embodiment of the present invention.

FIG. 27 is a flowchart illustrating a part of processing to be performed by the lens microcomputer 142.

In step S2001, the processing is started. Then, in step S2002, the lens microcomputer 142 clears presence-of-zooming-unit information and makes preparations for sending absence-of-zooming-unit information to the camera microcomputer 208. Then, control advances to step S2003 whereupon the lens microcomputer 142 clears specific lens group information and makes preparations for sending information, which indicates that the lens unit does not belong to the specific lens group, to the camera microcomputer 208. Subsequently, control proceeds to step S2004 whereupon it is judged by interruption processing whether the communication between the lens microcomputer 142 and the camera microcomputer 208 is completed. If completed, control goes back to step S2002. Otherwise, control goes back to step S2004.

As is understood from the foregoing description, in the case of the combination of the camera body unit 200 and the interchangeable lens unit 140, the absence-of-zooming-unit information is set by the lens microcomputer 142. Further, the specific lens group information is cleared (in steps S2002 and S2003). Thus, the camera microcomputer 208 judges (in steps S1803 and S1804) that the lens unit is not a specific lens group and no zooming unit is provided in the camera. Consequently, an electronic zooming mechanism (the enlargement processing circuit 205) provided in the camera body unit 200 functions.

Next, the video camera having the combination of the camera body unit 200 of the hardware configuration and the interchangeable lens unit 100 of the hardware configuration, which are shown in FIG. 4, will be described below. Incidentally, it is assumed that the interchangeable lens unit 100 does not have a manual zooming mechanism which cannot be controlled by a control signal inputted from an external device and that the lens unit 100 does not the "specific lens group".

Figure 28:
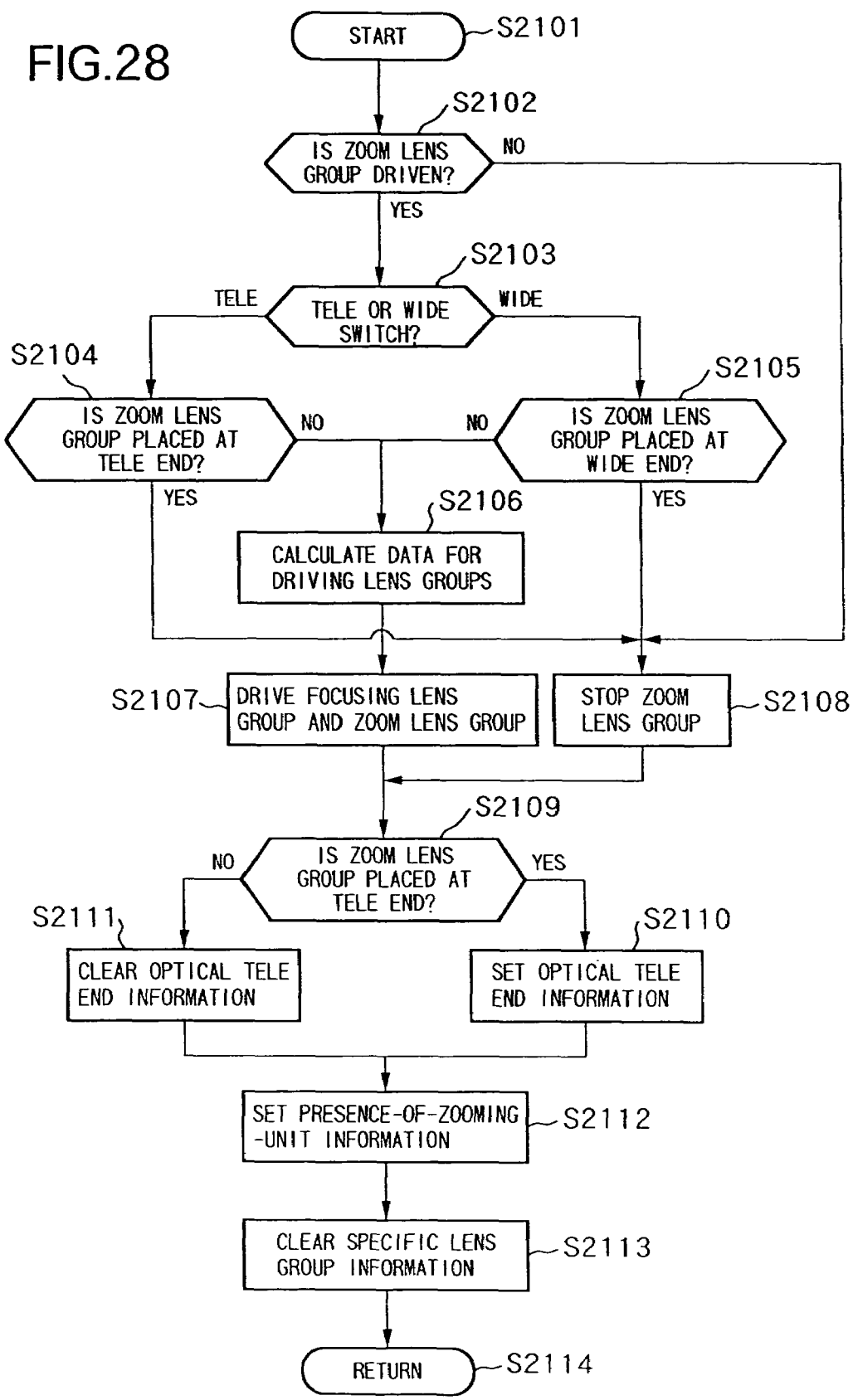
FIG. 28 is a flowchart illustrating zooming processing to be performed by the camera microcomputer of the interchangeable lens unit of FIG. 4 in the fifth embodiment of the present invention.

FIG. 28 is a flowchart illustrating processing concerning a zooming operation, which is a part of the entire processing to be performed by the lens microcomputer 115. In step S2101, the processing is started. Then, in step S2102, the lens microcomputer 115 checks whether the zoom lens stop request signal comes thereto from a camera microcomputer 208. If the zoom lens group has already stopped, control proceeds to step S2108. Otherwise, control advances to step S2103 whereupon the lens microcomputer 115 checks according to the information sent by the camera microcomputer 208 which of the tele direction and the wide direction the moving direction of the zoom lens group is. If the moving direction of the zoom lens group is the tele direction, control proceeds to step S2104. If the wide direction, control advances to step S2105.

In step S2104, the lens microcomputer 115 checks whether the zoom lens group is positioned at the tele end. If so, control proceeds to step S2108. Otherwise, control advances to step S2106. Further, in step S2105, the lens microcomputer 115 checks whether the zoom lens group is positioned at the wide end. If so, control proceeds to step S2108. Otherwise, control advances to step S2106. The moving speed of the zoom lens group and the moving speed and direction of the focusing lens group are calculated in step S2106. According to a result of this calculation, the zoom lens group and the focusing lens group are driven in step S2107. Furthermore, in step S2108, the zoom lens group is stopped.

Upon completion of the operation performed in step S2107 or S2108, the lens microcomputer 115 checks in step S2109 whether the zoom lens group is placed at the tele end. If so, control proceeds to step S2110. Otherwise, control advances to step S2111. In step S2110, the lens microcomputer 115 sets optical tele end information and makes preparations for sending this information to the camera microcomputer 208. Further, in step S2111, the lens microcomputer 115 clears optical tele end information and makes preparations for sending information, which indicates that the zoom lens group is not placed at the tele end, to the camera microcomputer 208. In step S2112, the lens microcomputer 115 sets presence-of-zooming-unit information and makes preparations for sending this information to the camera microcomputer 208. Then, control proceeds to step S2113 whereupon the lens microcomputer 115 clears specific lens group information and makes preparations for sending information, which indicates that the lens unit does not belong to the specific lens group, to the camera microcomputer 208. Subsequently, control advances to step S2114. Further, control returns to a main routine in step S2114.

As is understood from the foregoing description, in the case of the combination of the camera body unit 200 and the interchangeable lens unit 100, the presence-of-zooming-unit information is set (in step S2112) by the lens microcomputer 115. Further, the specific lens group information is cleared (in step S2113). Thus, the camera microcomputer 208 judges (in steps S1803 and S1804) that the lens unit is not a specific lens group and a zooming unit is provided in the camera. Consequently, an electronic zooming mechanism provided in the camera body unit 200 functions.

Incidentally, in the foregoing description of the fourth and fifth embodiments, it has been described that these embodiments are adapted to detect the zoom operating direction (namely, detect that the zoom lens group is operated toward the tele side or toward the wide side). However, the present invention is easily applied to a case that the camera has multi-zooming-speed in each zoom operating direction.

Further, even in the case that the camera body unit has a plurality of zoom operating means or that an external input device, such as a remote control device, for a camera body unit has zoom lens operating means, the present invention is easily applied to such a case by handling these means as a single zoom operating means in the camera body unit.

Moreover, in the foregoing description of the fifth embodiment, the specific lens group has been defined as a lens group having an optical lens group that cannot be controlled by a control signal inputted from an external device. However, it is apparent that other requirements, such as performance, price and use of the interchangeable lens unit, may be employed as the requirements for the specific lens group. Any of such requirements may be applied to the processing performed in the camera body unit, in view of consistency between such a requirement and the performance of or the manner of use of the electronic zooming function.

As described above, according to the fourth and fifth embodiments, an electronic zooming mechanism of the camera body unit smoothly functions according to the type of an external lens unit (for instance, an interchangeable lens unit), regardless of the presence/absence of an electrically controllable optical zooming mechanism in the external lens unit.

As many apparently widely different embodiments of the present invention can be made without departing from the spirit and scope thereof, it is to be understood that the invention is not limited to the specific embodiments thereof except as defined in the claims.

What is claimed is:
1. A camera system comprising:
a lens device having:
a variator lens means for performing a zooming operation;
lens-side zoom operating means for operating said variator lens means;
lens-side information output means for outputting first zoom operating information, which is received from said lens-side zoom operating means, and zoom position information on a zoom position of said variator lens means;
lens-side information input means for receiving second zoom operating information and zooming inhibition information from an external device; and
variator control means for controlling a zooming operation of said variator lens means according to the received second zoom operating information and the zooming inhibition information and the first zoom operating information, and an imaging apparatus having:
imaging means for imaging an object and for outputting an image signal;
camera-body-side information input means for receiving the first zoom operating information and zoom position information from said lens-side information output means;
camera-body-side zoom operating means for receiving the second zoom operating information to be supplied to said variator lens means;
camera-body-side information output means for outputting said lens-side information input means the second zoom operating information and the optical zooming inhibition which is used for inhibiting said variator lens means from performing a zooming operation;

electronic zooming means for performing electronic enlargement processing on an image represented by the image signal; and electronic zooming control means for controlling said electronic zooming means according to the first zoom operating information, the zoom position information and the second zoom operating information, wherein a cycle of transmission and reception of information between said lens-side information output means and said camera-body-side information input means and between said lens-side information input means and said camera-body-side information output means is nearly equal to a cycle of a standard television vertical synchronization signal.

2. A lens control system comprising:

a first device having optical variator means for optically changing a magnification of an image;

a second device having electronic variator means for electronically enlarging an image by signal processing; and first and second variator operating members respectively provided in said first and second devices, wherein, when said optical variator means is operated, said optical variator means is controlled in said first device according to information for operating said first and second variator operating members, wherein, when said electronic variator means is operated, said electronic variator means is controlled in said second device according to information for operating said first and second variator operating members, and wherein, when said electronic variator means is operated, said first device inhibits said optical variator means from operating.

3. A camera system comprising:

a lens device having an optical variator lens for optically changing a magnification of an image;

a camera device having electronic variator means for electronically enlarging an image by signal processing;

a lens-device-side variator operating member; and a camera-device-side variator operating member, wherein, when said optical variator lens is operated, said optical variator lens is controlled in said lens device according to information for operating said lens-device-side and camera-device-side variator operating members, wherein, when said electronic variator means is operated, said electronic variator means is controlled in said camera device according to information for operating said lens-device-side and camera-device-side variator operating members, and wherein, when said electronic variator means is operated, a signal causing said lens device to inhibit said optical variator lens from operating is transmitted to said lens device.

4. A camera device for use in a camera system having a lens device having an optical variator lens for optically changing a magnification of an image, a lens-device-side variator operating member and a camera-device-side variator operating member, said camera device comprising:

electronic variator means for electronically enlarging an image by signal processing, wherein, when said optical variator lens is operated, said optical variator lens is controlled in said lens device according to information for operating said lens-device-side and camera-device-side variator operating members, wherein, when said electronic variator means is operated, said electronic variator means is controlled in said camera device according to information for operating said lens-device-side and camera-device-side variator operating members, and wherein, when said electronic variator means is operated, a signal causing said lens device to inhibit said optical variator lens from operating is transmitted to said lens device.

5. A camera device for use in a camera system having a camera device having electronic variator means for electronically enlarging an image by signal processing, a lens-device-side variator operating member, and a camera-device-side variator operating member, said lens-device-side comprising:

an optical variator lens for optically changing a magnification of an image, wherein, when said optical variator lens is operated, said optical variator lens is controlled in said lens device according to information for operating said lens-device-side and camera-device-side variator operating members, wherein, when said electronic variator means is operated, said electronic variator means is controlled in said camera device according to information for operating said lens-device-side and camera-device-side variator operating members, and wherein, when said electronic variator means is operated, a signal causing said lens device to inhibit said optical variator lens from operating is transmitted to said lens device.

* * * * *